United States Patent
Zhao

(10) Patent No.: US 8,086,731 B2
(45) Date of Patent: Dec. 27, 2011

(54) METHOD, SYSTEM AND APPARATUS FOR COLLECTING STATISTICS OF CHARACTERISTIC VALUE WITH THRESHOLD

(75) Inventor: Hanbiao Zhao, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 5 days.

(21) Appl. No.: 12/671,503

(22) PCT Filed: Jul. 9, 2008

(86) PCT No.: PCT/CN2008/071594
§ 371 (c)(1),
(2), (4) Date: Jan. 29, 2010

(87) PCT Pub. No.: WO2009/021425
PCT Pub. Date: Feb. 19, 2009

(65) Prior Publication Data
US 2010/0235496 A1    Sep. 16, 2010

(30) Foreign Application Priority Data
Aug. 10, 2007    (CN) .......................... 2007 1 0120183

(51) Int. Cl.
*G06F 15/173* (2006.01)
(52) U.S. Cl. ........................ 709/224; 709/223
(58) Field of Classification Search ........... 709/223–224
See application file for complete search history.

(56) References Cited

U.S. PATENT DOCUMENTS

| | | | |
|---|---|---|---|
| 6,650,640 B1 * | 11/2003 | Muller et al. ................. | 370/392 |
| 6,826,620 B1 * | 11/2004 | Mawhinney et al. .......... | 709/235 |
| 6,882,624 B1 * | 4/2005 | Ma .............................. | 370/236.1 |
| 7,047,312 B1 * | 5/2006 | Aweya et al. ................. | 709/235 |
| 7,484,011 B1 * | 1/2009 | Agasaveeran et al. ........ | 709/250 |
| 2002/0059517 A1 * | 5/2002 | Haviv et al. .................. | 713/154 |
| 2002/0124103 A1 * | 9/2002 | Maruyama et al. ........... | 709/234 |
| 2003/0229702 A1 * | 12/2003 | Hensbergen et al. ......... | 709/228 |
| 2004/0102928 A1 | 5/2004 | Cuddihy et al. | |
| 2004/0250127 A1 * | 12/2004 | Scoredos et al. .............. | 713/201 |

FOREIGN PATENT DOCUMENTS

| | | |
|---|---|---|
| CN | 1874345 A | 12/2006 |
| CN | 101114938 A | 1/2008 |
| JP | 2003345682 A | 12/2003 |

* cited by examiner

*Primary Examiner* — Faruk Hamza
(74) *Attorney, Agent, or Firm* — Marshall, Gerstein & Borun LLP

(57) ABSTRACT

A method for collecting statistics of a characteristic value with a threshold includes: determining, according to a total threshold for a characteristic value whose statistic is to be collected, at least one sub-threshold corresponding to at least one application processing apparatus participating in statistic-collection; issuing the at least one sub-threshold respectively to the at least one application processing apparatus, notifying the at least one application processing apparatus to enter into a distributed statistic-collecting state; after receiving from anyone of the at least one application processing apparatus a notification which indicates that a current statistic value of the characteristic value of the application processing apparatus reaches a sub-threshold corresponding to the application processing apparatus, notifying the at least one application processing apparatus to enter into a centralized statistic-collecting state to collect statistics of the characteristic value in a centralized mode.

29 Claims, 8 Drawing Sheets

METHOD, SYSTEM AND APPARATUS FOR COLLECTING STATISTICS OF CHARACTERISTIC VALUE WITH THRESHOLD

FIELD OF THE INVENTION

The present invention relates to communications technologies, and more particularly, to a method, system and apparatus for collecting statistics of a characteristic value with a threshold.

BACKGROUND OF THE INVENTION

In a network apparatus, it is generally required to collect statistics of some parameters (also referred to as characteristic values). The characteristic values refer to items whose statistics need to be collected. For example, in a network security system, statistics of the number of various connections of a source or destination IP address are collected in order to block Denial of Service (DoS) attacks. As to some characteristic values, thresholds should be set in advance before the statistics are collected. When the statistics of a characteristic value reach or exceed the threshold, some restrictive processing is performed on a process which generates the characteristic value, so as to control the statistics to be within a range and satisfy specific requirements of the network.

SUMMARY OF THE INVENTION

In view of the above, embodiments of the present invention provide a method for collecting statistics of a characteristic value with a threshold.

Meanwhile, embodiments of the present invention also provide a system and apparatus for collecting statistics of a characteristic value with a threshold.

According to an embodiment of the present invention, a method for collecting statistics of a characteristic value with a threshold includes: determining, according to a total threshold of a characteristic value whose statistics is to be collected, at least one sub-threshold corresponding to at least one application processing apparatus participating in the statistic-collection; issuing the at least one sub-threshold respectively to the at least one application processing apparatus, and notifying the at least one application processing apparatus to enter into a distributed statistic-collecting state; and after receiving from anyone of the at least one application processing apparatus a notification which indicates that a current statistic value of the characteristic value in the application processing apparatus reaches the sub-threshold corresponding to the application processing apparatus, notifying the at least one application processing apparatus to enter into a centralized statistic-collecting state to collect the statistics of the characteristic value in a centralized mode.

According to another embodiment of the present invention, a centralized statistics-collecting apparatus includes: a sub-threshold calculation module, adapted to determine, according to a total threshold of a characteristic value whose statistic is to be collected, at least one sub-threshold corresponding to at least one application processing apparatus participating in statistic-collection; a control module, adapted to issue the at least one sub-threshold determined by the sub-threshold calculation module to the at least one application processing apparatus, notify the at least one application processing apparatus to enter into a distributed statistic-collecting state; notify, after receiving from any of the at least one application processing apparatus a notification which indicates that a current statistic value of the application processing apparatus exceeds a sub-threshold corresponding to the application processing apparatus, the at least one application processing apparatus to enter into a centralized statistic-collecting state, and notify a first statistic-collecting module to perform a centralized statistic-collection; and the first statistic-collecting module, adapted to receive from the control module a notification of performing the centralized statistic-collection and collect the statistic of the characteristic value in a centralized mode.

According to another embodiment of the present invention, a method for collecting statistics of a characteristic value with a threshold is provided. The method includes: receiving a first sub-threshold and a notification of entering into a distributed statistic-collecting state transmitted by a centralized statistics-collecting apparatus; collecting statistics of a characteristic value in a distributed mode according to a the notification of entering into a the distributed statistic-collecting state; notifying the centralized statistics-collecting apparatus when a current statistic value of the characteristic value reaches the first sub-threshold; receiving a notification of entering into a centralized statistic-collecting state; and collecting statistics of the characteristic value in a centralized mode according to a the notification of entering into a the centralized statistic-collecting state.

According to another embodiment of the present invention, an application processing apparatus includes: an interface module, adapted to receive a sub-threshold, a notification of entering into a distributed statistic-collecting state and a notification of entering into a centralized statistic-collecting state from a centralized statistics-collecting apparatus; and a second statistic-collecting module, adapted to receive the sub-threshold, the notification of entering into the distributed statistic-collecting state and the notification of entering into the centralized statistic-collecting state from the interface module, enter into the distributed statistic-collecting state after receiving the notification of entering into the distributed statistic-collecting state from the interface module, collect statistics of a characteristic value, update and store a current statistic value of the characteristic value; notify the centralized statistics-collecting apparatus through the interface module when the current statistic value reaches the sub-threshold, and collect statistics of the characteristic value in a centralized mode after receiving the notification of entering into the centralized statistic-collecting state.

According to another embodiment of the present invention, a method for collecting statistics of a characteristic value with a threshold is provided. The method includes: collecting statistics of a characteristic value according to a sub-threshold obtained from a centralized statistics-collecting apparatus; notifying the centralized statistics-collecting apparatus when a current statistic value of the characteristic value reaches the sub-threshold; and collecting statistics of the characteristic value in a centralized mode after receiving a notification of entering into a centralized statistic-collecting state from the centralized statistics-collecting apparatus.

According to another embodiment of the present invention, a system for collecting statistics of a characteristic value with a threshold includes: a centralized statistics-collecting apparatus and at least one application processing apparatus participating in statistic-collection; wherein the centralized statistics-collecting apparatus is adapted to determine, according to a total threshold of a characteristic value whose statistic is to be collected, at least one sub-threshold corresponding to the at least one application processing apparatus; issue the at least one sub-threshold respectively to the at least one application processing apparatus, and notify the at least one application processing apparatus to enter into a distributed statistic-collecting state; and notify, after receiving from anyone of the at least one application processing apparatus a notification which indicates that a current statistic value of the application processing apparatus reaches a sub-threshold corresponding to the application processing apparatus, the at least one application processing apparatus to enter into a centralized statistic-collecting state; and each of the at least one application processing apparatus is adapted to collect statistics of the characteristic value after receiving a notification of entering into the distributed statistic-collecting state from the centralized statistics-collecting apparatus, notify the centralized statistics-collecting apparatus when a current statistic value of the characteristic value reaches a sub-threshold corresponding to the service processing apparatus; and collect statistics of the characteristic value in a centralized mode after receiving a notification of entering into the centralized statistic-collecting state from the centralized statistics-collecting apparatus.

As can be seen from the above technical scheme that, in embodiments of the present invention, a centralized statistics-collecting apparatus is configured. The centralized statistics-collecting apparatus determines, according to a total threshold for a characteristic value whose statistics need to be collected, sub-thresholds corresponding to different application processing apparatuses; issues the sub-thresholds respectively to the application processing apparatuses, and notifies the application processing apparatuses to enter into a distributed statistic-collecting state. In the distributed statistic-collecting state, each application processing apparatus collects statistics of the characteristic value and notifies the centralized statistics-collecting apparatus when a current statistic value of the characteristic value reaches or exceeds a sub-threshold. Then the centralized statistics-collecting apparatus notifies all the application processing apparatuses to enter into the centralized statistic-collecting state and starts to collect statistics of the characteristic value in the centralized mode. Thereby, the statistic-collection of the characteristic value with threshold is realized.

In the distributed statistic-collecting state, the application processing apparatus can directly perform an operation which results in the change of the characteristic value in order to collect statistics of the characteristic value, but does not need to report to the centralized statistics-collecting apparatus through a packet, which greatly reduces the burden of a switch network between the centralized statistics-collecting apparatus and the application processing apparatuses and also reduces a switch performance requirement of the switch network. Meanwhile, when a current statistic value of the characteristic value in any application processing apparatus reaches the sub-threshold, the application processing apparatus may enter into the centralized statistic-collecting state, so that a restrictive operation corresponding to the characteristic value can become effective when the sum of current statistic values of all application processing apparatuses exceeds a total threshold, thus strict restriction of the total threshold is ensured.

DETAILED DESCRIPTION OF THE INVENTION

Figure 1:
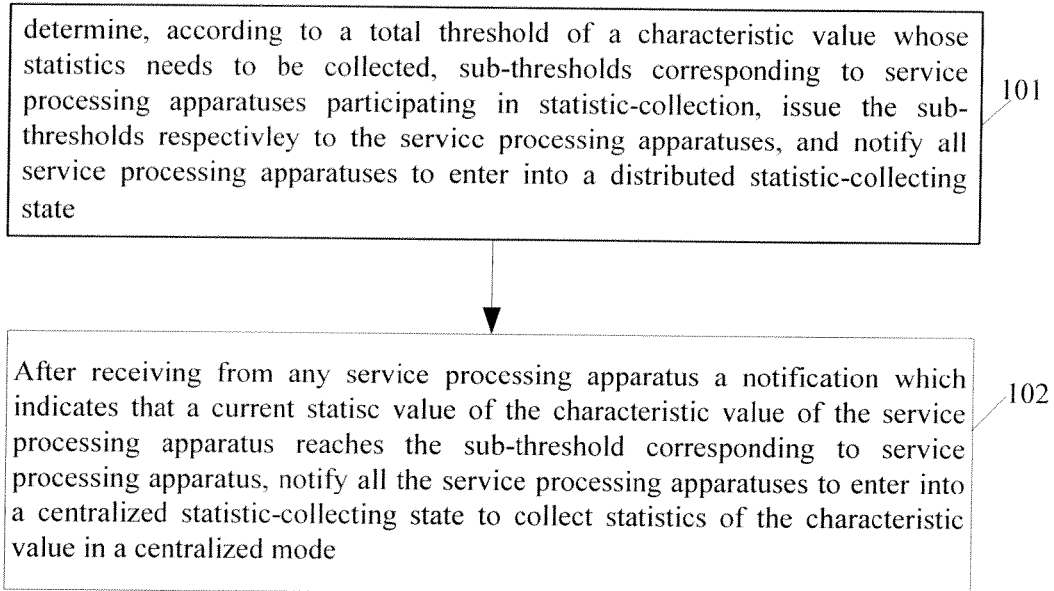
FIG. 1 is a flowchart of a method for collecting statistics of a characteristic value with a threshold according to an embodiment of the present invention.

The present invention will be described hereinafter in detail with reference to accompanying drawings and embodiments.

With enlargement of network scale, many conventional functions located at a single network device may be implemented in a distributed mode. Each distributed system includes one main control apparatus and multiple application processing apparatuses. Conventional application processing functions implemented by a single device may be distributed to different application processing apparatuses. Therefore, when collect statistics of a parameter in a distributed system, all application processing apparatuses should be considered comprehensively. In this type of distributed systems, when statistics of a characteristic value with a threshold is collected, the threshold is generally set as a restriction value of the sum of all statistic values of all the application processing apparatuses.

Currently, the statistic-collection of the characteristic value with the threshold in the distributed systems is usually implemented in a centralized mode. Hereinafter, the centralized mode is described in detail.

In current statistic-collection of the characteristic value with the threshold, a typical application is as follows: in a network security system, statistics of the number of various connections of a source or destination IP address are collected in order to block Denial of Service (DoS) attacks. In the statistic-collection of the number of various connections, some restrictive processing should be performed when the number of connections exceeds the threshold, e.g. restrict the number of sessions, the number of User Data Packet (UDP)

connections, the number of Synchronization connections and the number of Internet Control Messages Protocol (ICMP) connections.

Currently, in the distributed system, a statistic-collection process of a characteristic value is generally initiated by the main control apparatus. When the main control apparatus needs to trigger the statistic-collection of the characteristic value with threshold, it notifies each application processing apparatus. Each application processing apparatus reports operations related to the change of the characteristic value to the main control apparatus. That is, when the main control apparatus needs to trigger the statistic-collection of the characteristic value with threshold, each application processing apparatus reports its atomic operation to the statistics value of the characteristic value, e.g. plus 1 or minus 1, to the main control apparatus through a first control message. After receiving the first control message from the application processing apparatus, the main control apparatus performs the plus 1 or minus 1 operation to a stored characteristic value and determines whether a current statistic value of the characteristic value exceeds the threshold. If the current statistic value of the characteristic value exceeds the threshold, the main control apparatus transmits a second control message to notify each application processing apparatus to start a corresponding restrictive operation. Otherwise, the main control apparatus transmits a third control message to the application processing apparatus which transmits the first control message to perform a normal operation. After receiving the second control message or the third control message from the main control apparatus, the application processing apparatus performs the restrictive operation or the normal operation according to message contents.

The above statistic-collecting method can ensure that the total threshold is strictly enforced in the distributed system. However, in the above statistic-collecting method, each application processing apparatus should report all operations related to the change of the characteristic value to the main control apparatus through the first control message and cannot perform the operations before being permitted by the main control apparatus. As a result, during an application processing process, the statistic-collection requires exchanging a large number of control messages and has a relatively high requirement for a switch network. Generally, only switch networks such as Infiniband and Peripheral Component Interconnect Expression (PCIE) can meet such application processing requirement. However, this type of switch network is relatively expensive at present and it is not advisable to set up this type of switch network just for the statistic-collection of the characteristic value.

In an embodiment of the present invention, when collecting statistics of a characteristic value, a centralized statistics-collecting apparatus is configured and the statistics of the characteristic value is collected in a first centralized then distributed statistic-collection mode, thereby implementing the statistic-collection of the characteristic value with threshold. Meanwhile, the number of control messages exchanged between the centralized statistics-collecting apparatus and the application processing apparatuses is smaller than the number of control messages exchanged in the centralized mode. Thereby, the performance requirement for the switch network becomes lower.

In this embodiment, the centralized statistics-collecting apparatus should be configured in advance and is further configured with a total threshold therein. The centralized statistics-collecting apparatus may be one part of the main control apparatus, or be one part of one pre-designated application processing apparatus, or be a newly-added apparatus dedicated for the centralized statistic-collection. In the following description, the independent apparatus for implementing the centralized statistic-collection, the part of the main control apparatus and the part of the pre-designated application processing apparatus for implementing the centralized statistic-collection function are called by a uniform name, i.e. the centralized statistics-collecting apparatus. Locations and connection relationships between the centralized statistics-collecting apparatus and the application processing apparatuses in the drawings are arranged for illustrating their functions but not denoting physical locations of them.

FIG. 1 is a flowchart of a method of statistic-collection for a characteristic value with a threshold according to an embodiment of the present invention. As shown in FIG. 1, the method includes:

Step 101: determine, according to a total threshold of a characteristic value whose statistics needs to be collected, sub-thresholds corresponding to application processing apparatuses participating in the statistic-collection, issue the sub-thresholds respectively to the application processing apparatuses, and notify all the application processing apparatuses to enter into a distributed statistic-collecting state.

In this step, it is required to convert the total threshold of the characteristic value into the sub-thresholds, e.g. divide the total threshold into several sub-thresholds and each application processing apparatus is assigned with a sub-threshold corresponding to the application processing apparatus. Herein, the total threshold may be evenly divided into several identical parts. The total threshold may also be divided into several parts with different sizes according to a policy, and the sum of all the parts equals to the total threshold. The number of the parts is generally not smaller than the number of the application processing apparatuses.

Step 102: After receiving from any application processing apparatus a notification that a current statistic value of the characteristic value in the application processing apparatus reaches the sub-threshold corresponding to application processing apparatus, notify all the application processing apparatuses to enter into a centralized statistic-collecting state to collect the statistics of the characteristic value in a centralized mode.

In this step, each application processing apparatus collects statistics of the characteristic value according to the sub-threshold received. If a current statistic value of the characteristic value does not reach the sub-threshold received, each application processing apparatus allows an operation which results in the change of the characteristic value. When the current statistic value of the characteristic value reaches the sub-threshold, each application processing apparatus reports the operation which results in the change of the characteristic value to the centralized statistics-collecting apparatus.

Figure 2:
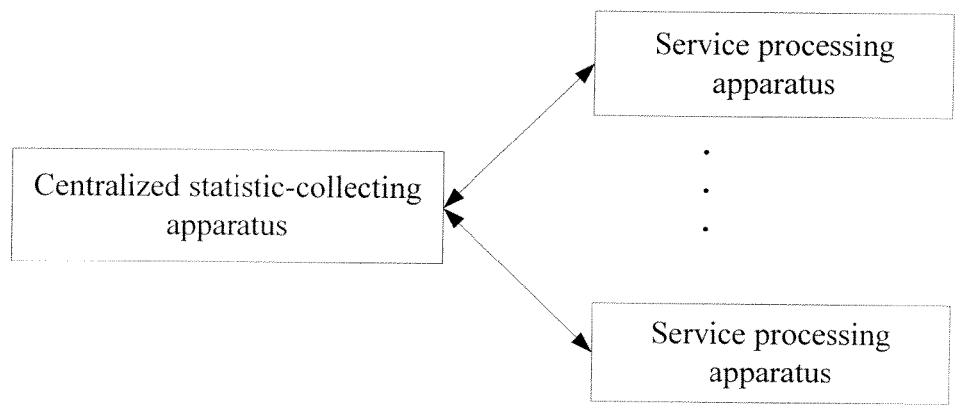
FIG. 2 is a schematic diagram illustrating a structure of a system for collecting statistics of a characteristic value with a threshold according to an embodiment of the present invention.

FIG. 2 is a schematic diagram illustrating a structure of a system for collecting statistics of a characteristic value with a threshold according to an embodiment of the present invention. As shown in FIG. 2, the system includes a centralized statistics-collecting apparatus and at least one, e.g. two, application processing apparatuses.

In the system, the centralized statistics-collecting apparatus is adapted to store a total threshold preset for collecting statistics of the characteristic value, determine sub-thresholds respectively corresponding to different application processing apparatuses according to the total threshold, issue the sub-thresholds respectively to the application processing apparatuses, and notify all the application processing apparatuses to enter into a distributed statistic-collecting state. After receiving from any application processing apparatus a notification which indicates that a current statistic value of the characteristic value exceeds a sub-threshold corresponding to the application processing apparatus, the centralized statistics-collecting apparatus is adapted to notify all the application processing apparatuses to enter into a centralized statistic-collecting state.

The at least one application processing apparatus is adapted to collect statistics of the characteristic value after receiving from the centralized statistics-collecting apparatus the notification of entering into the distributed statistic-collecting state, and notify the main control apparatus when a current statistic value of the characteristic value in the application processing apparatus reaches or exceeds the sub-threshold; collect statistics of the characteristic value in the centralized mode after receiving from the main control apparatus the notification of entering into the centralized statistic-collecting state.

Figure 3:
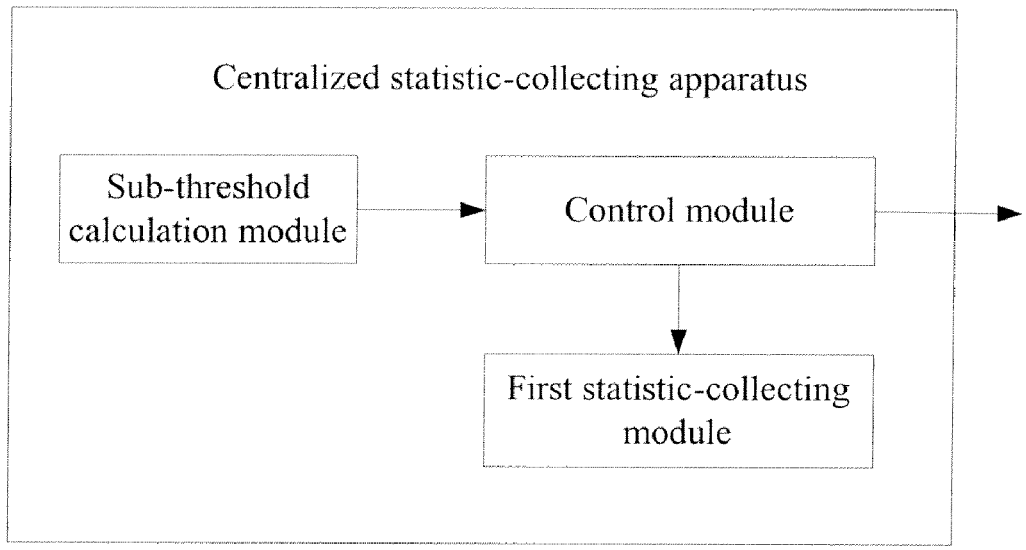
FIG. 3 is a schematic diagram illustrating a structure of a centralized statistics-collecting apparatus according to an embodiment of the present invention.

FIG. 3 is a schematic diagram illustrating a structure of a centralized statistics-collecting apparatus according to an embodiment of the present invention. The centralized statistics-collecting apparatus may be applied to the system shown in FIG. 2. It includes a sub-threshold calculation module, a control module and a first statistic-collecting module.

In the centralized statistics-collecting apparatus, the sub-threshold calculation module is adapted to store a total threshold preset for collecting statistics of the characteristic value; determine, according to the total threshold, sub-thresholds respectively corresponding to different application processing apparatuses participating in the statistic-collection; and transmit the sub-thresholds to the control module.

The control module is adapted to issue the sub-thresholds to the application processing apparatuses respectively, and notify the application processing apparatuses participating in the statistic-collection to enter into a distributed statistic-collecting state; after receiving from any application processing apparatus a notification which indicates that a current statistic value of the characteristic value exceeds the sub-threshold, notify the application processing apparatuses to enter into a centralized statistic-collecting state, and notify the first statistic-collecting module to collect statistics in the centralized mode.

The first statistic-collecting module is adapted to collect statistics of the characteristic value in the centralized mode after receiving the notification from the control module.

Figure 4:
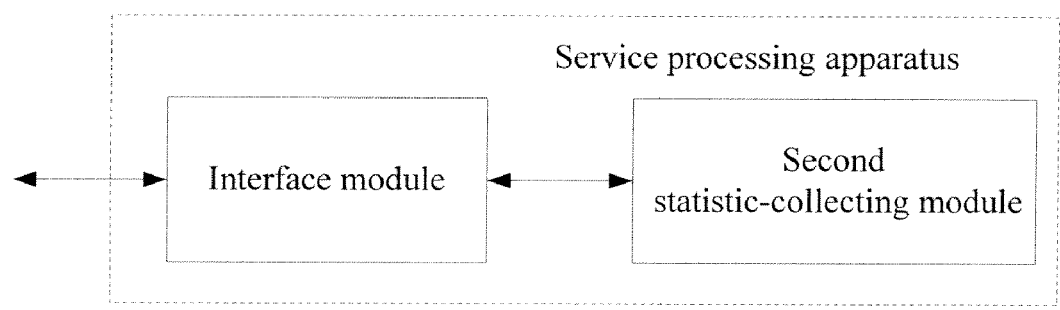
FIG. 4 is a schematic diagram illustrating a structure of an application processing apparatus according to an embodiment of the present invention.

FIG. 4 is a schematic diagram illustrating a structure of an application processing apparatus according to an embodiment of the present invention. The application processing apparatus may be applied to the system shown in FIG. 2. It includes an interface module and a second statistic-collecting module.

The interface module in the application processing apparatus is adapted to forward a notification of entering into a distributed statistic-collecting state, a notification of entering into a centralized statistic-collecting state and a sub-threshold received from the centralized statistics-collecting apparatus in the system to the second statistic-collecting module.

The second statistic-collecting module is adapted to collect statistics of the characteristic value after receiving the notification of entering into the distributed statistic-collecting state, update and store a current statistic value of the characteristic value, and notify the centralized statistics-collecting apparatus through the interface module when the current statistic value reaches the sub-threshold corresponding to the application processing apparatus, and collect statistics of the characteristic value in the centralized mode after receiving the notification of entering into the centralized statistic-collecting state.

As can be seen from the above, in the present invention, when a current statistic value of each application processing apparatus does not reach a corresponding sub-threshold, the application processing apparatus can directly perform an operation which results in the change of the characteristic value but needs not report to the centralized statistics-collecting apparatus. Thereby, the number of control messages exchanged between the centralized statistics-collecting apparatus and the application processing apparatuses can be greatly reduced. However, if it is always in the distributed statistic-collecting state, it is possible that an application processing apparatus has already reached its sub-threshold while the sum of the statistic values of the characteristic value of all the application processing apparatuses does not reach the total threshold. At this time, restriction processing should not be performed because it is the sum of the statistic values of the characteristic value of all the application processing apparatus that is restricted according to the total threshold. In order to ensure strict enforcement of the total threshold, the centralized statistic-collection is started when a current statistic value of the characteristic value in any application processing apparatus reaches its corresponding sub-threshold. It can be seen that, through the present invention, in a former stage of the statistic-collection, the distributed statistic-collection is performed in the application processing apparatuses; after the statistic value reaches a certain value, the centralized statistic-collection is performed and whether to perform the restriction processing is determined. In a word, a first centralized then distributed statistic-collection mode is applied in the system, which can reduce the number of control messages exchanged, decrease the performance requirement for the switch network and ensure strict restriction of the total threshold at the same time.

In the following embodiments, the implementation of the present invention is described by taking a distributed system as an exemplary application scenario. The distributed system may consist of multiple separate apparatuses, or may be one independent apparatus in which multiple different single boards are adopted to implement application processing. In the following embodiments, the present invention is described by taking the single independent apparatus as an example, wherein an application processing unit corresponds to the above application processing apparatus and a main control unit corresponds to the centralized statistics-collecting apparatus.

First Embodiment

In this embodiment, a distributed apparatus collects statistics of the number of session connections to a certain destination IP address, such as IP1. That is, the characteristic value is the number of session connections to the IP1.

Figure 5:
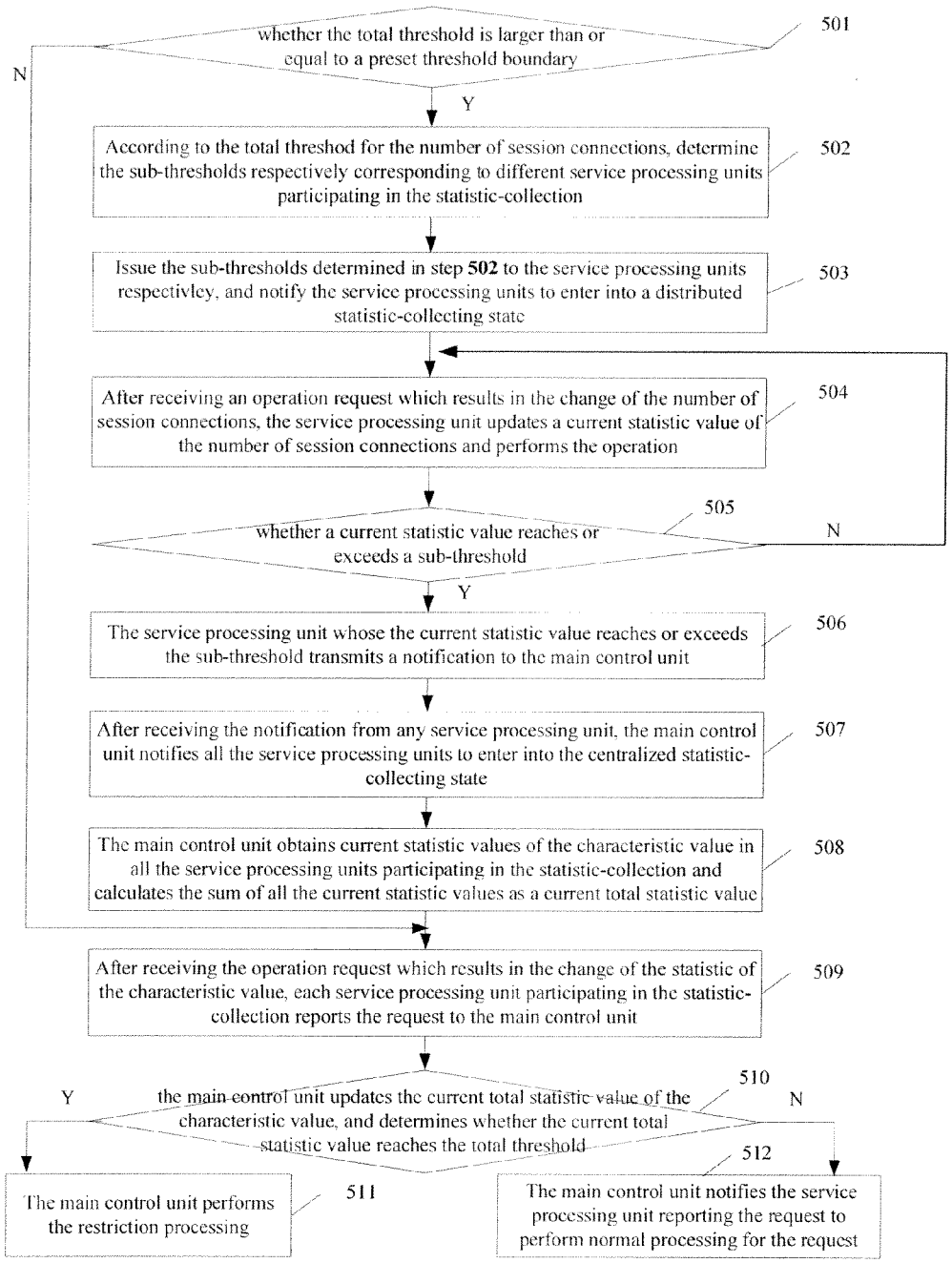
FIG. 5 is a flowchart illustrating a method of distributed statistic-collection for sessions according to a first embodiment of the present invention.

FIG. 5 is a flowchart illustrating a method of distributed statistic-collection for the number of session connections according to the first embodiment of the present invention. In the method, the main control unit is firstly configured as a centralized statistics-collecting apparatus, and a total threshold for the number of session connections is configured in the main control unit by a network manager. The specific statistic-collection process includes the following steps.

Step 501: The main control unit determines whether the total threshold of the number of session connections is larger than or equal to a preset threshold boundary. If yes, proceed to step 502 to perform distributed statistic-collection; otherwise, proceed to step 509 to perform centralized statistic-collection.

As to the statistic-collection of the characteristic value with a threshold, when the total threshold is relatively small, e.g. when the total threshold is smaller than the number of application processing units participating in the statistic-collection, it may be impossible or unnecessary to perform the distributed statistic-collection. Therefore, in order to ensure normal processing of the distributed statistic-collection, the threshold boundary is preferably set in advance in this embodiment to determine whether the statistic of the characteristic value can be collected in the distributed mode. Specifically, if the total threshold of the characteristic value (i.e. the number of session connections) is larger than or equal to the preset threshold boundary, the distributed mode is adopted; otherwise, the conventional centralized mode is used.

Specifically, the threshold boundary may be set through: setting an appropriate threshold boundary according to the number of application processing units and the type of the characteristic value (e.g. the type of connections whose statistic is collected in this embodiment). Herein, the threshold boundary should not be too high; otherwise, there will be a rather high threshold for performing the first centralized then distributed statistic-collection, the statistic-collection for most characteristic values will always be performed in the centralized statistic-collecting state, and the switch network between the main control unit and the application processing units still has a heavy burden. The threshold boundary should not be too low, either. If the threshold boundary is too low, it may result in entering into the distributed statistic-collecting state even if the total threshold is relatively small. At this moment, the total threshold is relatively small and the sub-thresholds are thus also relatively small, the method will rapidly enter into the centralized statistic-collecting state from the distributed statistic-collecting state. When the method enters into the centralized statistic-collecting state, the main control unit should transmit a notification to all application processing units, which makes the number of control messages bearing the notification in this process larger than the number of control messages exchanged when always in the centralized statistic-collecting state. In this case, the distributed statistic-collection is not worth the candle at all. Furthermore, the number of control messages between the main control unit and the application processing units is also relevant to the type of the connection. Therefore, the setting of the threshold boundary is also relevant to the type of the connection. In some embodiments, the threshold boundary should be larger than the number of the application processing units, so as to make sure that every application processing unit participating in the statistic-collection may be assigned with a sub-threshold.

Certainly, this embodiment may not include step 501 and may directly begin with step 502.

Step 502: According to the total threshold of the number of session connections, determine the sub-thresholds respectively corresponding to different application processing units participating in the statistic-collection.

In this step, the total threshold for restricting the total number of session connections is firstly converted into the sub-thresholds respectively corresponding to the different application processing units. In this embodiment, the sum of all the sub-thresholds equals to the total threshold.

Specifically, when dividing the total threshold to determine the sub-thresholds, it is possible to divide the total threshold evenly into identical sub-thresholds according to the total number of the application processing units participating in the statistic-collection. Or, it is also possible to divide the total threshold according to processing capabilities or service loads of the different application processing units, so as to determine different sub-thresholds for the different application processing units participating in the statistic-collection. Generally, when all the application processing units participating in the statistic-collection are equivalent to each other in processing capabilities, the former dividing manner is used. When the different application processing units have different processing capabilities, the latter dividing manner is used. Herein, the so-called application processing units participating in the statistic-collection refer to application processing units relevant to an operation which results in the change of the characteristic value whose statistics is collected. For example, in this embodiment, the statistics of the number of session connections to IP1 is collected, and thus the application processing units participating in the statistic-collection are the application processing units capable of establishing or releasing a session to IP1.

Step 503: Issue the sub-thresholds determined in step 502 to the application processing units respectively, and notify the application processing units to enter into a distributed statistic-collecting state.

In this embodiment, a new message may be defined to carry the sub-thresholds determined. And transmit the new message to the application processing units respectively. After receiving the new message, each of the application processing units stores a sub-threshold assigned to it, creates the characteristic value and enters into the distributed statistic-collecting state.

In the present invention, all the application processing apparatuses keep in a same statistic-collecting state as the main control apparatus. In this embodiment, it means that all the application processing units keep in a same statistic-collecting state as the main control unit.

Hereinafter, in the distributed statistic-collecting state, the different application processing units respectively collect statistics of the number of session connections in real-time, which specifically includes the following steps.

Step 504: After receiving a request of an operation which results in the change of the number of session connections, an application processing unit updates a current statistic value of the number of session connections and performs the operation.

In the distributed statistic-collecting state, the process of updating the current statistic value of the characteristic value and performing the operation by each of the different application processing units after receiving the request of the operation which results in the change of the statistics of the characteristic value refers to a process of updating the current statistic value of the number of session connections and performing an operation of session establishment or session release after receiving a request of establishing or releasing a session to IP1. The number of session connections may be updated through: adding 1 to the number of session connections to get the current statistic value when the request is session establishment, and subtracting 1 from the number of session connections to get the current statistic value when the request is session release.

As can be seen from this step, according to the distributed statistic-collection in the present invention, after receiving the request of the operation which results in the change of the statistics of the characteristic value, an application processing unit needs not report a control message to the main control unit to ask for an instruction on whether to perform the operation but can directly perform the operation. Thereby, the number of control messages exchanged between the main control unit and the application processing unit is greatly reduced.

Step 505: The application processing unit receiving the request in step 504 determines whether a current statistic value reaches or exceeds a sub-threshold stored. If the current statistic value reaches or exceeds the sub-threshold stored, proceed to step 506; otherwise, return to step 504.

The determining in this step may be performed each time before or after the current statistic value is updated, or be performed only before or after the current statistic value is increased. Specifically, when the statistics of the number of sessions is collected, the determining in this step may be performed in both situations including: when a request for session establishment is received and after the current statistic value is updated, and when a request for session release is received and after the current statistic value is updated. Or, the determining in this step may be performed only when the request for session establishment is received and after the current statistic value is updated, but is not performed when the request for session release is received and after the current statistic value is updated.

Step 506: The application processing unit whose the current statistic value reaches or exceeds the sub-threshold transmits a notification to the main control unit.

Till now, any application processing unit notifies the main control unit when its current statistic value reaches or exceeds the sub-threshold.

Step 507: After receiving the notification from any application processing unit, the main control unit determines that the current statistic value of the application processing unit reaches or exceeds the sub-threshold and notifies all the application processing units to enter into the centralized statistic-collecting state.

In this step, all the application processing units may be notified to enter into the centralized statistic-collecting state by the following manners.

It should be considered that the following situation may appear: current statistic values of at least two application processing units reach corresponding sub-thresholds and the at least two application processing units simultaneously transmit notifications to the main control unit, while the main control unit can only receive the notifications sequentially and thus may transmit notifications to notify all the application processing units to enter into the centralized statistic-collecting state repeatedly. Therefore, preferably, the main control unit may first determine whether a notification is received for the first time. If the notification is received for the first time, the main control unit notifies all the application processing units to enter into the centralized statistic-collecting state. Otherwise, it indicates that the main control unit has already transmitted the notification and the main control unit needs not transmit the notification again.

Till now, all the application processing units and the main control unit have exited from the distributed statistic-collecting state and entered into the centralized statistic-collecting state to collect statistics of the characteristic value in the centralized mode. In this embodiment, in the centralized statistic-collecting state, when collecting the statistics of the characteristic value in the centralized mode, the main control unit and all the application processing units perform the following operations.

Step 508: The main control unit obtains current statistic values of the characteristic value of all application processing units participating in the statistic-collection and calculates the sum of all the current statistic values as a current total statistic value.

In this step, considering the statistic-collection situations of all application processing units participating in the statistic-collection, the main control unit records a current statistic status of the characteristic value. Specifically, the main control unit may obtain the current statistic values of the characteristic value of all the application processing units participating in the statistic-collection by way of: requesting a current statistic value of the characteristic value from each application processing unit through the notification transmitted to all the application processing units in step 507, or transmitting an additional message to request to obtain the current statistic value. After obtaining the current statistic values of all the application processing units, the main control unit takes the sum of all the current statistic values as the current total statistic value and performs centralized statistic-collection based on the total statistic value.

Step 509: After receiving the request of the operation which results in the change of the statistic of the characteristic value, each application processing unit participating in the statistic-collection reports the request to the main control unit.

Step 510: After receiving the reported request, the main control unit determines whether the current total statistic value reaches the total threshold. If yes, proceed to step 511; otherwise, update the current total statistic value of the characteristic value and proceed to step 512.

In this step, the main control unit collects the statistic of the characteristic value in the centralized mode, updates the current total statistic value and checks whether the current total statistic value reaches the total threshold momentarily. If the current total statistic value reaches the total threshold, the main control unit performs restriction processing; otherwise, the main control unit notifies the application processing units to perform normal processing. Preferably, during the centralized statistic-collection, the main control unit respectively stores a current statistic value of each application processing unit. And the current statistic value of the corresponding characteristic value in the main control unit changes consistently with the current statistic value of the characteristic value in each application processing unit. In particular, in this embodiment, the main control unit stores the current statistic value of the number of session connections to IP1 in each application processing unit, and the stored current statistic value keeps consistent with the current statistic value of the number of session connections to IP1 stored in each application processing unit.

Step 511: The main control unit performs the restriction processing.

In this step, the restriction processing may be: notifying the application processing unit reporting the request to refuse the request, and/or recording a threshold overflow event into a log, and/or giving to a management system an alarm that the number of session connections exceeds the threshold.

Step 512: The main control unit notifies the application processing unit reporting the request to perform normal processing for the request.

Till now, the method in this embodiment is finished. Or, considering that the number of session connections may be reduced gradually due to the affection of session release operation, when the current statistic value in the main control unit is reduced to a lower level, the method may return to the distributed statistic-collecting state in order to further reduce the number of control messages exchanged. Therefore, preferably, in the centralized statistic-collecting state, the main control unit may store and update the sum of the current statistic values of all the application processing units or respectively store and update the current statistic values of all the application processing units. And after step 509, the following operations will be performed in this embodiment.

If the main control unit stores and updates the sum of the current statistic values of all the application processing units, an appropriate total lower threshold may be set according to the total threshold. The main control unit compares the sum of the current statistic values with the total lower threshold. If the sum of the current statistic values is smaller than the total lower threshold, the main control unit notifies all the application processing units to enter into the distributed statistic-collecting state, and returns to step 504 to collect the statistics of the characteristic value in the distributed mode. Otherwise, proceed to step 510. The total lower threshold should not be set as too high in order to avoid a frequent switch between the distributed statistic-collecting state and the centralized statistic-collecting state. Meanwhile, the total lower threshold should not be set as too low either in order to avoid a too large gap between the total lower threshold and the total threshold which results in staying in the centralized statistic-collecting state for a long time and thus may bring a too heavy burden to the switch network due to the control messages exchanged between the main control unit and the application processing units. The total lower threshold may be set as a certain percent, preferably 90%, of the total threshold; or be set as a designated definite number.

If the main control unit respectively stores and updates the current statistic values of all the application processing units, appropriate lower thresholds may be set respectively for all the application processing units according to the total threshold and the sub-thresholds of the application processing units. The main control unit respectively compares current statistic values of all the application processing units with the lower thresholds respectively preset for the application processing units. If all or a certain percent of the current statistic values of the application processing units are lower than their corresponding lower thresholds, or if it is determined to enter into the distributed statistic-collecting state according to another policy, the main control unit notifies all the application processing units to enter into the distributed statistic-collecting state, and returns to step 504 in which the statistics of the characteristic value is collected in the distributed mode. Otherwise, step 510 is performed. Herein, when it is determined to enter into the distributed statistic-collecting state, a sub-threshold of an application processing unit whose current statistic value reaches the sub-threshold may be increased according to a preset policy so as to make the application processing unit enter into the distributed statistic-collecting state based on the increased sub-threshold. For example, a portion of a difference between the lower threshold and the sum of the current statistic values of all the application processing units may be assigned to the application processing unit whose current statistic value reaches the sub-threshold. For another example, it is also possible to lower the sub-thresholds of some application processing units whose current statistic values are relatively small and assign the lowered portion to the application processing unit whose current statistic value reaches the sub-threshold. The lower thresholds should not be set as too high in order to avoid a frequent switch between the distributed statistic-collecting state and the centralized statistic-collecting state. Meanwhile, the lower thresholds should not be set as too low either in order to avoid a too large gap between the lower thresholds and the corresponding sub-thresholds which results in staying in the centralized statistic-collecting state for a long time and thus bring a too heavy burden to the switch network due to the control messages exchanged between the main control unit and the application processing units. Generally, the lower thresholds may be set as a certain percent, preferably 90%, of the corresponding sub-thresholds; or be set as designated definite numbers.

The above comparing operations may be performed each time after a current statistic value is updated (including that the current statistic value is increased and decreased), or be performed only after the current statistic value is decreased. Specifically, when the statistics of the number of sessions is collected, the comparing operations may be performed in both situations including: when a request for session establishment is received and after the current statistic value is updated, and when a request for session release is received and after the current statistic value is updated. Or, the comparing operations may be performed only when the request for session release is received and after the current statistic value is updated, but is not performed when the request for session establishment is received and after the current statistic value is updated.

Figure 6:
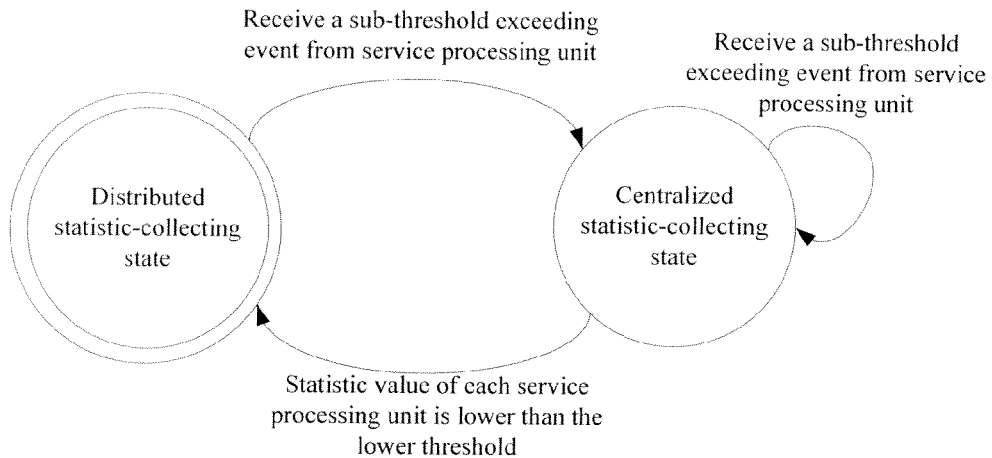
FIG. 6 is a state transition diagram of a main control unit according to the first embodiment of the present invention.
Figure 7:
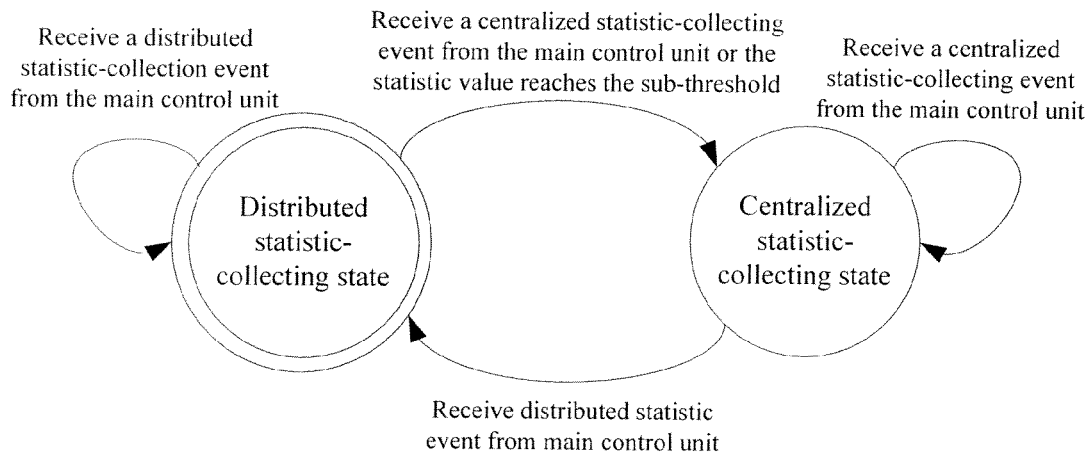
FIG. 7 is a state transition diagram of an application processing unit according to the first embodiment of the present invention.

Through the method in the above embodiment, FIG. 6 and FIG. 7 can be obtained, which respectively illustrate a state transition diagram of a main control unit and an application processing unit. In FIG. 6 and FIG. 7, the circle representing the distributed statistic-collecting state has two boundaries, which indicates that the distributed statistic-collecting state is an initial state, i.e. step 501 is omitted and step 502 is performed directly. As can be seen from FIG. 6 and FIG. 7, during a statistic-collection process of the number of session connections, along with the change of the number of session connections, the application processing units and the main control unit may switch between the distributed statistic-collecting state and the centralized statistic-collecting state, so as to reduce the number of control messages exchanged between the main control unit and the application processing units during the statistic-collection as many as possible, and to ensure the restriction of the total threshold meanwhile.

Embodiments of the present invention further provide a distributed statistic-collecting system. The system is shown in FIG. 2. Hereinafter, the statistic-collection performed in a single device is taken as an example to describe the structure of the system. Specifically, the device includes a main control unit and application processsing units. The main control unit is the centralized statistics-collecting apparatus shown in FIG. 2 and the application processsing units are the application processing apparatuses shown in FIG. 2. Structures of the main control unit and the application processing units may be similar to the centralized statistics-collecting apparatus and the application processing apparatuses respectively shown in FIG. 3 and FIG. 4, and may be applied to implement the method shown in FIG. 5. In this embodiment, the main control unit has a structure identical to the structure shown in FIG. 3, which includes a sub-threshold calculation module, a control module and a first statistic-collecting module.

The control module in the main control unit is adapted to store a total threshold set for collecting statistics of the characteristic value, compare the total threshold with a preset threshold boundary, and trigger the sub-threshold calculation module to calculate sub-thresholds if the total threshold is larger than or equal to the threshold boundary. After being triggered by the control module, the sub-threshold calculation module determines, according to the total threshold of the characteristic value whose statistics is to be collected, the sub-thresholds corresponding to different application processing apparatuses participating in the statistic-collection and transmits the sub-thresholds to the control module.

The control module issues the sub-thresholds respectively to the application processing apparatuses participating in the statistic-collection of the number of session connections, notifies the application processing apparatuses to enter into a distributed statistic-collecting state; and after receiving from any application processing apparatus a notification which indicates that a current statistic value of the characteristic value exceeds its sub-threshold, notifies the application processing apparatuses to enter into a centralized statistic-collecting state and notifies the first statistic-collecting module to collect statistics in the centralized mode. The first statistic-collecting module collects statistics in the centralized mode after receiving the notification from the control module.

Considering that it is possible to switch from the centralized statistic-collecting state to the distributed statistic-collecting state because the number of session connections may be reduced, preferably, the first statistic-collecting module of the main control unit respectively stores and updates the current statistic values of all the application processing units, and provides the updated current statistic values to the control module. After receiving the updated current statistic values from the first statistic-collecting module, the control module compares the current statistic values respectively with lower thresholds respectively preset for the application processing units. When the current statistic values of the application processing units are respectively smaller than their corresponding lower thresholds, the control module notifies all the application processing units and the first statistic-collecting module to exit from the centralized statistic-collecting state and enter into the distributed statistic-collecting state. After receiving the notification of entering into the distributed statistic-collecting state, the first statistic-collecting module stops collecting the statistics in the centralized mode.

In this embodiment, the application processing unit has a structure identical to that shown in FIG. 4, which includes an interface module and a second statistic-collecting module.

The interface module in the application processing unit is adapted to forward the notification of entering into the distributed statistic-collecting state, the notification of entering into the centralized statistic-collecting state and the sub-threshold transmitted from the main control unit to the second statistic-collecting module.

The second statistic-collecting module is adapted to collect statistics of the number of session connections after receiving the notification of entering into the distributed statistic-collecting state, update and store a current statistic value of the number of session connections, and notify the main control unit when the current statistic value reaches the sub-threshold corresponding to the application processing unit; and collect statistics of the number of session connections in the centralized statistic mode after receiving the notification of entering into the centralized statistic-collecting state.

Similarly, considering that it is possible to switch from the centralized statistic-collecting state to the distributed statistic-collecting state because the number of session connections may be reduced, preferably, after the main control unit transmits to each application processing unit the notification of exiting from the centralized statistic-collecting state and entering into the distributed statistic-collecting state, the interface module of the application processing unit forwards the notification of entering into the distributed statistic-collecting state to the second statistic-collecting module. After receiving the notification of entering into the distributed statistic-collecting state, the second statistic-collecting module collects the statistics in the distributed mode.

In this embodiment, when the statistics is collected in the centralized mode, the main control unit obtains the current statistic values of all the application processing units and calculates the sum of the current statistic values to collect statistics of the characteristic value in the centralized mode.

Actually, when the main control unit currently has a relatively heavy operation burden, any application processing unit designated in advance may perform the operations of the main control unit during the above statistic-collection. In other words, the centralized statistics-collecting apparatus may be configured as apart of a certain application processing unit. Specifically, first, a manager configures the total threshold of the characteristic value in the designated application processing unit, or the main control unit issues the total threshold configured in the main control unit by the manager to the designated application processing unit. Then, the designated application processing unit obtains current statistic values of all application processing units and calculates the sum of the current statistic values to collect statistics of the characteristic value in the centralized mode. Further, after receiving a request of an operation which results in the change of the characteristic value, an application processing unit other than the designated application processing unit forwards the request to the designated application processing unit. After receiving the request, the designated application processing unit collects statistics to determine whether a normal operation or a restrictive operation should be performed. Thus, the designated application processing unit needs not transmit a control message or report an operation request to itself, which reduces the number of control messages exchanged between one application processing unit and the main control unit.

Alternatively, the centralized statistics-collecting apparatus may be configured as a newly-added apparatus dedicated for the centralized statistic-collection. During the statistic-collection, the newly-added apparatus performs the same operations as the main control unit during the statistic-collection in this embodiment.

Second Embodiment

When collecting statistics of the number of connections in a distributed system such as a network security device, as to the statistics of the number of session connections in the first embodiment, the number of session connections may increase due to an operation of session establishment or decrease due to an operation of session release. As to the statistics of the number of UDP connections or SYN connections or ICMP connections, the statistics may increase due to an operation of connection establishment, but may not decrease because there is no operation of connection release. Therefore, with respect to the distributed statistic-collection for the number of these types of connections, the statistic-collection manner may be a little different from the first embodiment. In this embodiment, the detailed statistic-collection manner will be described by taking the statistic-collection of SYN connections as an example.

Figure 8:
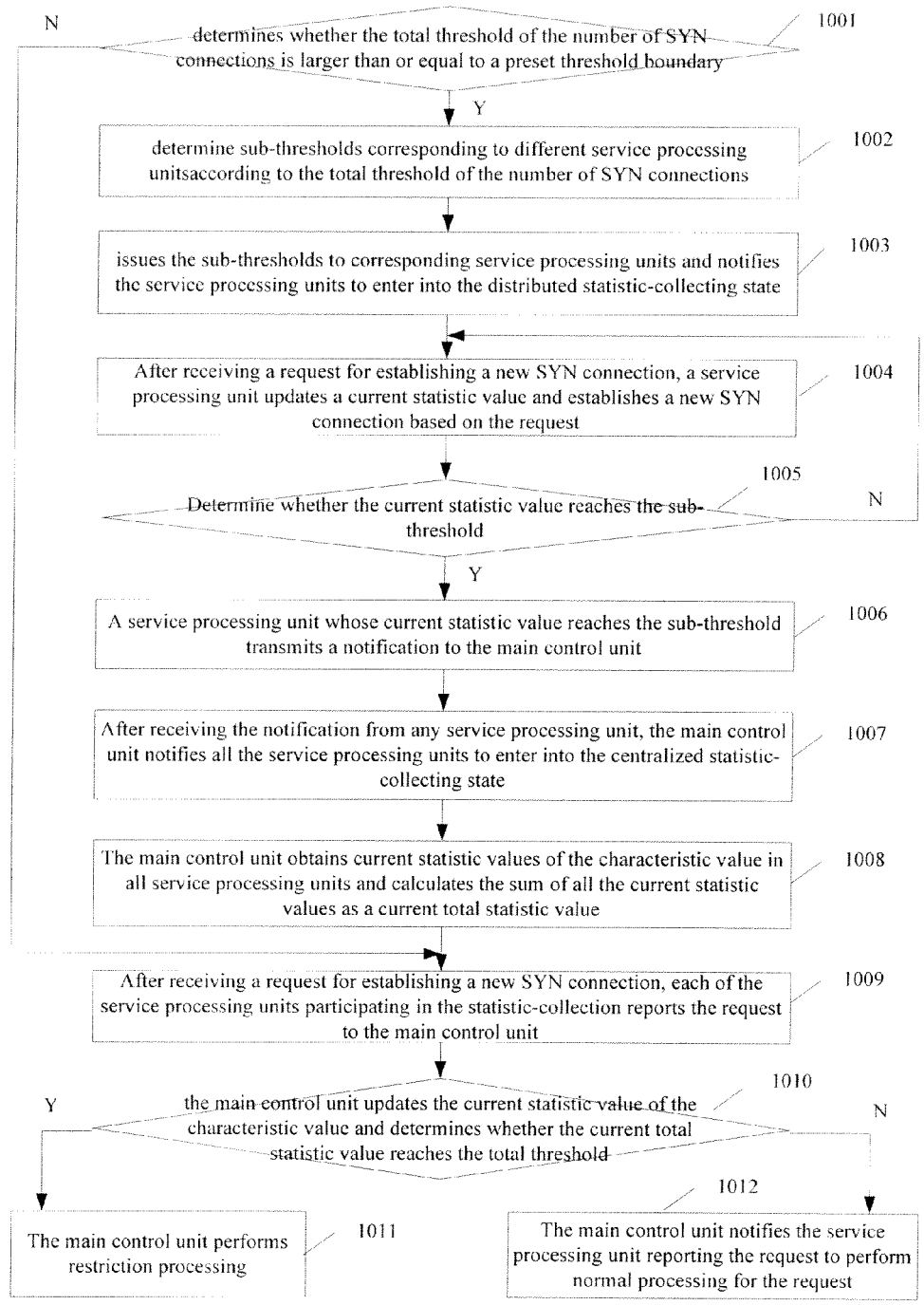
FIG. 8 is a flowchart illustrating a method of distributed statistic-collection for the number of SYN connections according to a second embodiment of the present invention.

FIG. 8 is a flowchart illustrating a method of distributed statistic-collection for the number of SYN connections according to a second embodiment of the present invention. Similar as the first embodiment, the method configures the centralized statistics-collecting apparatus as the main control unit and configures a total threshold for a characteristic value in the main control unit. The method specifically includes the following steps.

Step 1001: The main control unit determines whether the total threshold of the number of SYN connections is larger than or equal to a preset threshold boundary. If the number of SYN connections is larger than or equal to the preset threshold boundary, proceed to step 1002 and subsequent steps to collect the statistics in the distributed mode; otherwise, proceed to step 1009 and subsequent steps to collect the statistics in the centralized mode.

Steps 1002~1003: The main control unit determines, according to the total threshold of the number of SYN connections, sub-thresholds corresponding to different application processing units participating in the statistic-collection; respectively issues the sub-thresholds to corresponding application processing units and notifies the application processing units to enter into a distributed statistic-collecting state.

Operations in the above steps 1001~1003 are similar to those in steps 501~503 in the first embodiment and will not be described again.

Step 1004: After receiving a request for establishing a new SYN connection, an application processing unit updates a current statistic value and establishes a new SYN connection based on the request.

In this embodiment, the statistics of the number of SYN connections is collected. Therefore, the operation which results in the change of the characteristic value is the establishment of the new SYN connection. The current statistic value may be updated by way of: adding 1 to the number of SYN connections as the current statistic value after receiving the request for establishing a new SYN connection.

Step 1005: Determine whether the current statistic value reaches the sub-threshold stored. If the current statistic value reaches the sub-threshold, proceed to step 1006; otherwise, return to step 1004.

Steps 1006~1008: The application processing unit whose current statistic value reaches the sub-threshold transmits a notification to the main control unit. After receiving the notification from the application processing unit, the main control unit determines that the current statistic value of the application processing unit reaches the corresponding sub-threshold, then notifies all the application processing units to enter into a centralized statistic-collecting state. The main control unit obtains current statistic values of the characteristic value of all application processing units participating in the statistic-collection, and calculates the sum of all the current statistic values as a current total statistic value.

Steps 1009~4012: After receiving a request for establishing a new SYN connection, an application processing unit participating in the statistic-collection reports the request to the main control unit. After receiving the request reported, the main control unit determines whether the current total statistic value reaches the total threshold; if the current total statistic value reaches the total threshold, performs restriction processing; otherwise, updates the current statistic value of the characteristic value and notifies the application processing unit reporting the request to perform normal processing for the request.

Till now, the method in this embodiment may be finished. In the above method, similar to the first embodiment, after entering into the centralized statistic-collecting state, it is possible to select to exit from the centralized statistic-collecting state and enter into the distributed statistic-collecting state. Since the statistic-collection of the number of SYN connections is relevant to time, the exiting from the centralized statistic-collecting state may be implemented by a manner of clearing up periodically. Specifically, when the set time arrives, clear up the current statistic values of the number of the SYN connects in both the main control unit and the application processing units. And the main control unit and the application processing units automatically return to the distributed statistic-collecting state. Then return to step 1004. Herein, the set time may be randomly selected, e.g. 1 second. With respect to the statistic-collection of the characteristic value which exits from the centralized statistic-collecting state by clearing up periodically, the main control unit may store or may not store the current statistic values respectively corresponding to the application processing units.

Figure 9:
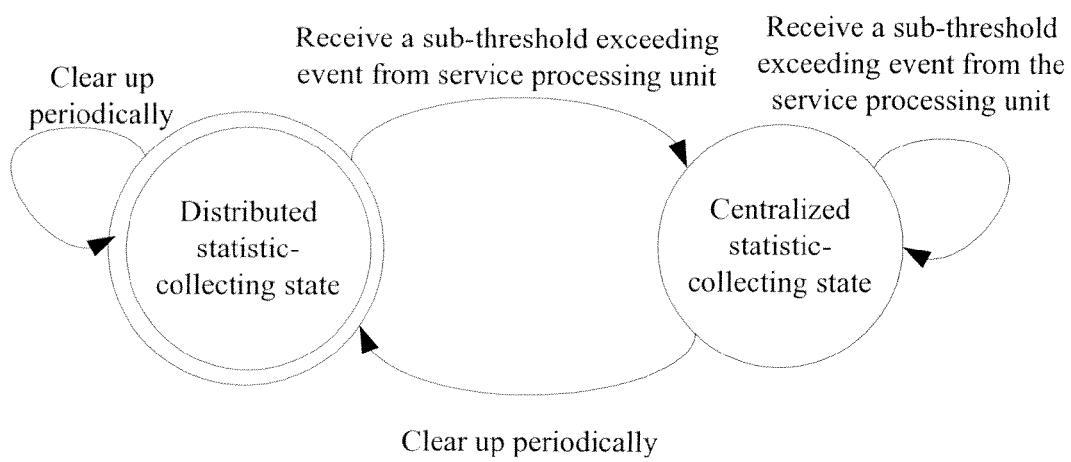
FIG. 9 is a state transition diagram of a main control unit according to the second embodiment of the present invention.
Figure 10:
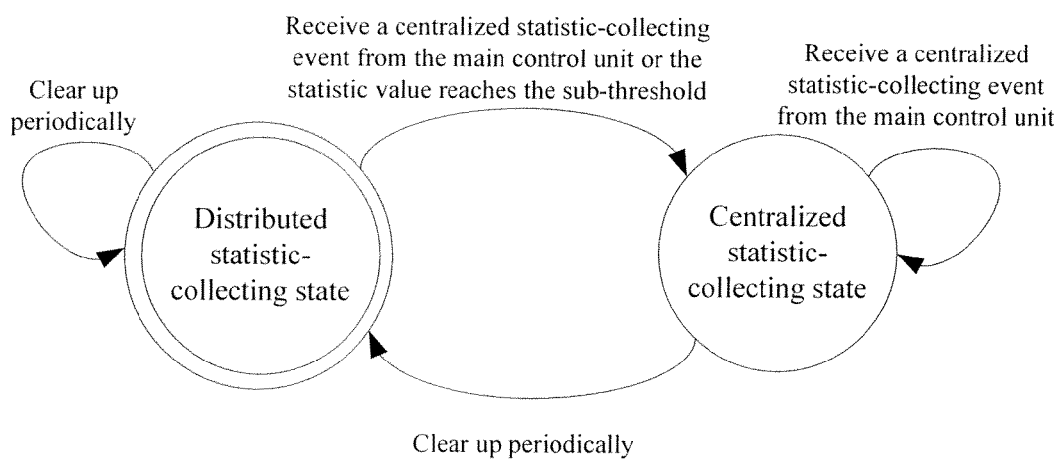
FIG. 10 is a state transition diagram of an application processing unit according to the second embodiment of the present invention.

According to the above method in this embodiment, FIG. 9 and FIG. 10 can be obtained, which respectively illustrate a state transition diagram of a main control unit and an application processing unit.

Embodiments of the present invention further provide a distributed statistic-collecting system. Similar to the first embodiment, the structure of the system is still described by taking the statistic-collection in a single device as an example. Similar to the first embodiment, the device includes application processsing units and a main control unit. The application processing units and the main control unit have structures similar to those in the first embodiment. What is different is: in this embodiment, what is collected is the statistics of the number of the SYN connects. Further, because the statistic-collection of the number of SYN connections is relevant to time, during the statistic-collection, operations of the application processsing units and the main control unit when exiting from the centralized statistic-collecting state and entering into the distributed statistic-collecting state are also different from the first embodiment. Specifically, in this embodiment, after entering into the centralized statistic-collecting state, the first statistic-collecting module of the main control unit may stop the centralized statistic-collecting state and switch to the distributed statistic-collecting state after every preset time interval. After entering into the centralized statistic-collecting state, the second statistic-collecting module of the application processing unit clears up the stored current statistic value and enters into the distributed statistic-collecting state after every preset time interval.

Similar to the first embodiment, operations of the main control unit in the second embodiment may also be performed by any application processing unit, which will not be described again herein.

In the above two embodiments, the sub-thresholds determined for different application processing units according to the total threshold of the characteristic value are all fixed. However, when service amounts processed by different application processing units differ from each other enormously, i.e. when the applications are inclined to some of the application processing units, a situation may arise that the current statistic values of some application processing units already reach or approach the corresponding sub-thresholds while the current statistic values of the other application processing units are still far smaller than the their corresponding sub-thresholds. At this moment, if the centralized statistic-collection is started, before the total current statistic value reaches the total threshold, the number of control messages exchanged between the main control unit and the application processing units is relatively large.

With respect to the above situation, during the statistic-collection of the characteristic value, the present invention may further respectively update the sub-thresholds of the application processing units in real-time according to the current statistic values of the application processing units, so as to shorten a period of the centralized statistic-collecting state as much as possible and further to reduce the number of control messages exchanged between the main control unit and the application processing units. Hereinafter, implementation of a sub-threshold update mechanism will be described through several embodiments.

Third Embodiment

In this embodiment, the statistic-collection of the number of sessions is taken as an example again. Each time after the current statistic value of an application processing unit reaches the sub-threshold and after the main control unit is notified, an update operation is performed to the sub-threshold.

In this embodiment, initially, the sub-thresholds are configured in a same manner as the first embodiment, i.e., in a manner of dividing the total threshold into sub-thresholds according to number of the application processing units participating in the statistic-collection. The sum of all the sub-thresholds equals to the total threshold. Before the sub-thresholds are updated, current statistic values of all the application processing units participating in the statistic-collection are obtained and a difference between the total threshold and the sum of the current statistic values of all the application processing units is calculated. The difference is taken as a current security margin. That is, the service amount which can still be normally processed at present is calculated. Then, new sub-thresholds of the application processing units are determined according to the security margin.

Figure 11:
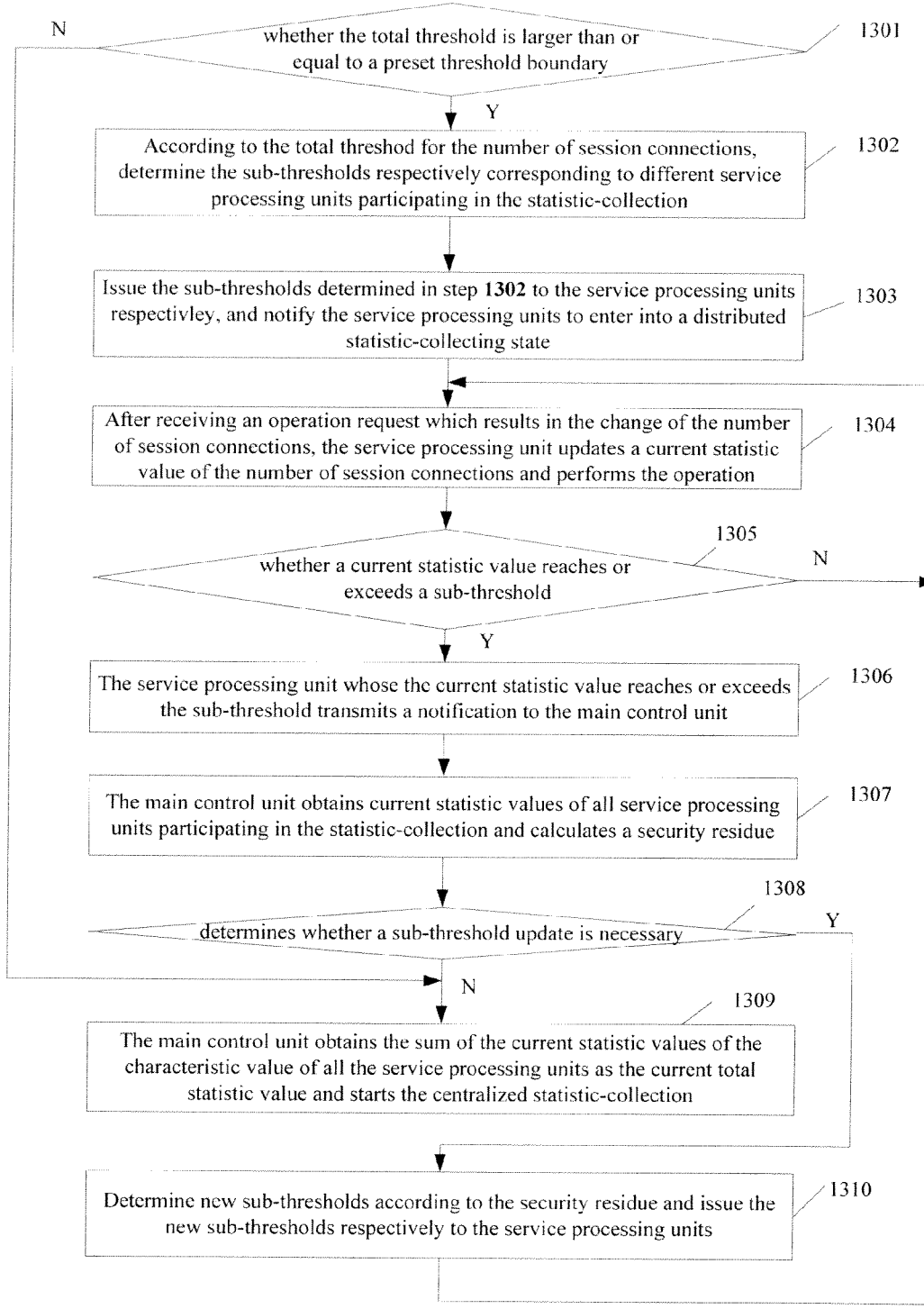
FIG. 11 is a flowchart illustrating a method of distributed statistic-collection for sessions according to a third embodiment of the present invention.

FIG. 11 is a flowchart illustrating a method of distributed statistic-collection for sessions according to a third embodiment of the present invention. As shown in FIG. 11, the method includes the following steps.

Steps 1301~1306 are similar to steps 501~506 in the first embodiment, which will not be described again herein.

Step 1307: The main control unit obtains current statistic values of all application processing units participating in the statistic-collection and calculates a security margin.

In this step, the main control unit may calculate the security margin by way of: calculating the sum of the obtained current statistic values of the characteristic value of all the application processing units, and taking a difference between a total threshold and the sum as the security margin. In other words, the security margin indicates the number of session connections which can still be processed normally before restriction processing is performed to the session connections.

Step 1308: According to the security margin and a preset sub-threshold update policy, the main control unit determines whether a sub-threshold update operation is necessary. If yes, proceed to step 1310 to update the sub-thresholds; otherwise, proceed to step 1309.

In this step, whether the sub-threshold update is necessary may be determined by way of: comparing the security margin with a preset threshold boundary; if the security margin is larger than or equal to the preset threshold boundary, determining that the sub-threshold update is necessary; otherwise, determining that the sub-threshold update is unnecessary and entering into the centralized statistic-collecting state directly. Or, whether the sub-threshold update is necessary may be determined by way of: determining whether the security margin reaches a preset value or a percentage of the total threshold; if yes, determining that the sub-threshold update is necessary; otherwise, determining that the sub-threshold update is unnecessary and entering into the centralized statistic-collecting state directly. There may be other reasonable ways for determining whether the sub-threshold update is necessary, which will not be described herein.

It can be seen from comparing the above determining operation based on comparing with the threshold boundary and the operation in step 1301 that, the step of determining whether the sub-threshold update is necessary is actually equivalent to the step of determining whether the remaining security margin meets a condition of distributed statistic-collection, and thereby determining whether it is possible to assign the security margin again to each application processing unit for the distributed statistic-collection.

Step 1309: The main control unit obtains the sum of the current statistic values of the characteristic value of all the application processing units as the current total statistic value and starts the centralized statistic-collection.

In this step, after determining the current total statistic value, the main control unit enters into the centralized statistic-collecting state. During the centralized statistic-collection, specific operations are similar to those in steps 509~511, which will not be described in herein.

Step 1310: Determine new sub-thresholds according to the security margin and issue the new sub-thresholds respectively to the application processing units, and then return to step 1304.

In this step, the new sub-thresholds may be determined according to the security margin by the following manner: the main control unit evenly divides the security margin into several average values according to the number of the application processing units participating in the statistic-collection, respectively takes the sum of the average value and the current statistic value of each application processing unit obtained in step 1307 as the new sub-threshold for the application processing unit, and issues the new sub-thresholds respectively to all the application processing units. Each application processing unit updates the stored sub-threshold according to the new sub-threshold received and enters into the distributed statistic-collecting state based on the current statistic value. Or the new sub-thresholds may be determined according to the security margin the following manner: the main control unit divides the security margin according to the current statistic values of the application processing units participating in the statistic-collection, i.e. assigns a higher new sub-threshold to an application processing unit with a higher current statistic value and assigns a lower new sub-threshold to an application processing unit with a lower current statistic value; and the assignment may be performed in proportion. Then return to step 1304.

The above operations for updating the sub-thresholds enable each application processing unit to determine its own new sub-threshold, make the statistic-collection of the characteristic value stay in the distributed statistic-collecting state to the most extent, balance the number of redundant connections which can be normally processed between different application processing units, further shorten the period of centralized statistic-collecting state, and reduce the number of control messages exchanged between the main control unit and the application processing units.

Till now, the method of this embodiment may be finished. Certainly, considering that the number of session connections may be reduced gradually due to an operation of session release, similar to the first embodiment, after the current total statistic value is reduced to some extent, this embodiment may return to the distributed statistic-collecting state so as to further reduce the number of control messages exchanged between the main control unit and the application processing units.

The updating the sub-thresholds in this embodiment may be performed repeatedly until the security margin calculated cannot meet a preset requirement for updating the sub-thresholds and makes it impossible to update the sub-thresholds, e.g. until the security margin is smaller than the preset threshold boundary.

In this embodiment, in order to further improve the effect of the sub-threshold update, the main control unit may periodically determine whether the sub-threshold update is necessary and periodically perform specific update operations, so as to achieve an objective of pre-adjusting the sub-thresholds.

In particular, in the distributed statistic-collecting state, the main control unit periodically obtains the current statistic values of the characteristic value of all application processing units participating in the statistic-collection, and determines according to the current statistic values whether the services are inclined to some service processing units. If yes, preliminarily determine that the sub-threshold update is necessary. Then, the main control unit calculates a current security margin and further determines according to the current security margin whether the sub-threshold update is necessary. If necessary, update the sub-thresholds and notify each application processing unit; otherwise, switch to the distributed statistic-collecting state. The calculation of the security margin, the further determination and the sub-threshold update are similar to those in steps 1308~1310, which will not be described again herein.

Whether the services are inclined to some application processing units is determined according to the current statistic values of all the application processing units by way of: calculating a difference between a maximum value and a minimum value among all the current statistic values; comparing the difference with a preset difference threshold; if the difference is larger than the preset difference threshold, determining that the services are inclined and the sub-threshold update is necessary; otherwise, determining that services are not inclined and the sub-threshold update is unnecessary. Or, whether the services are inclined to some application processing units is determined according to the current statistic values by way of: calculating a difference between the sum of all the current statistic values and the total threshold, comparing the difference with a difference threshold; if the difference is larger than the difference threshold, determining that the sub-threshold update is necessary; if the difference is not larger than the difference threshold, determining that the sub-threshold update is unnecessary. Herein, the difference threshold may be set according to relationships between the total threshold and the sub-thresholds.

Besides re-assigning the security margin described above, the sub-thresholds may be also be updated through the following manners.

Calculating a difference between the maximum value and the minimum value among all the current statistic values; comparing the difference with a preset difference threshold; if the difference is larger than the preset difference threshold, adjusting, by the main control unit, sub-thresholds of application processing units whose current statistic values are the maximum value and the minimum value respectively. The adjustment may be: lowering the sub-threshold of the application processing unit whose current statistic value is the minimum value by an adjustment amount, and adding the adjusted amount to the sub-threshold of the application processing unit whose current statistic value is the maximum value.

The above processing may be repeated until the difference between the maximum value and the minimum value among all the current statistic values is smaller than the difference threshold. The adjusted amount of the main control unit may be determined according to a policy, e.g. may be a half of the difference between the sub-thresholds of the application processing units whose current statistic values are the minimum value and the minimum value.

Embodiments of the present invention further provide a distributed statistic-collecting system. As described above, the structure of the system is still described by taking the threshold statistic-collection in a single device as an example. The device includes service processsing units and a main control unit. In this embodiment, the application processing units and the main control unit may adopt structures similar to the first embodiment. Further, besides the functions in the first embodiment, the control module of the main control unit in this embodiment may determine whether the sub-threshold update is necessary after entering into the distributed statistic-collecting state, and may notify the sub-threshold calculation module to update the sub-thresholds if the sub-threshold update is necessary. After receiving a notification of updating the sub-thresholds, the sub-threshold calculation module updates the sub-thresholds and transmits the updated sub-thresholds to the control module. After receiving the updated sub-thresholds, the control module transmits the updated sub-thresholds respectively to the corresponding application processing units. In this embodiment, besides the functions in the first embodiment, the interface module of the application processing unit may further forward an updated sub-threshold from the main control unit to the second statistic-collecting module, and the second statistic-collecting module updates the stored sub-threshold according to the sub-threshold received, and continues with the distributed statistic-collection.

Fourth Embodiment

In this embodiment, initially, sub-thresholds are configured in a different manner from the forgoing embodiments. Specifically, a total threshold is divided into multiple sub-thresholds, and the number of the sub-thresholds is larger than the number of application processing units participating in the statistic-collection. When the sub-thresholds are assigned, each application processing unit is assigned with one sub-threshold and other sub-thresholds are reserved. When the sub-thresholds are updated, the remaining sub-thresholds reserved in the main control unit are assigned to the application processing units whose sub-thresholds need to be updated so as to increase the sub-thresholds of the application processing units. Herein, one sub-threshold is assigned to one application processing unit each time.

Figure 12:
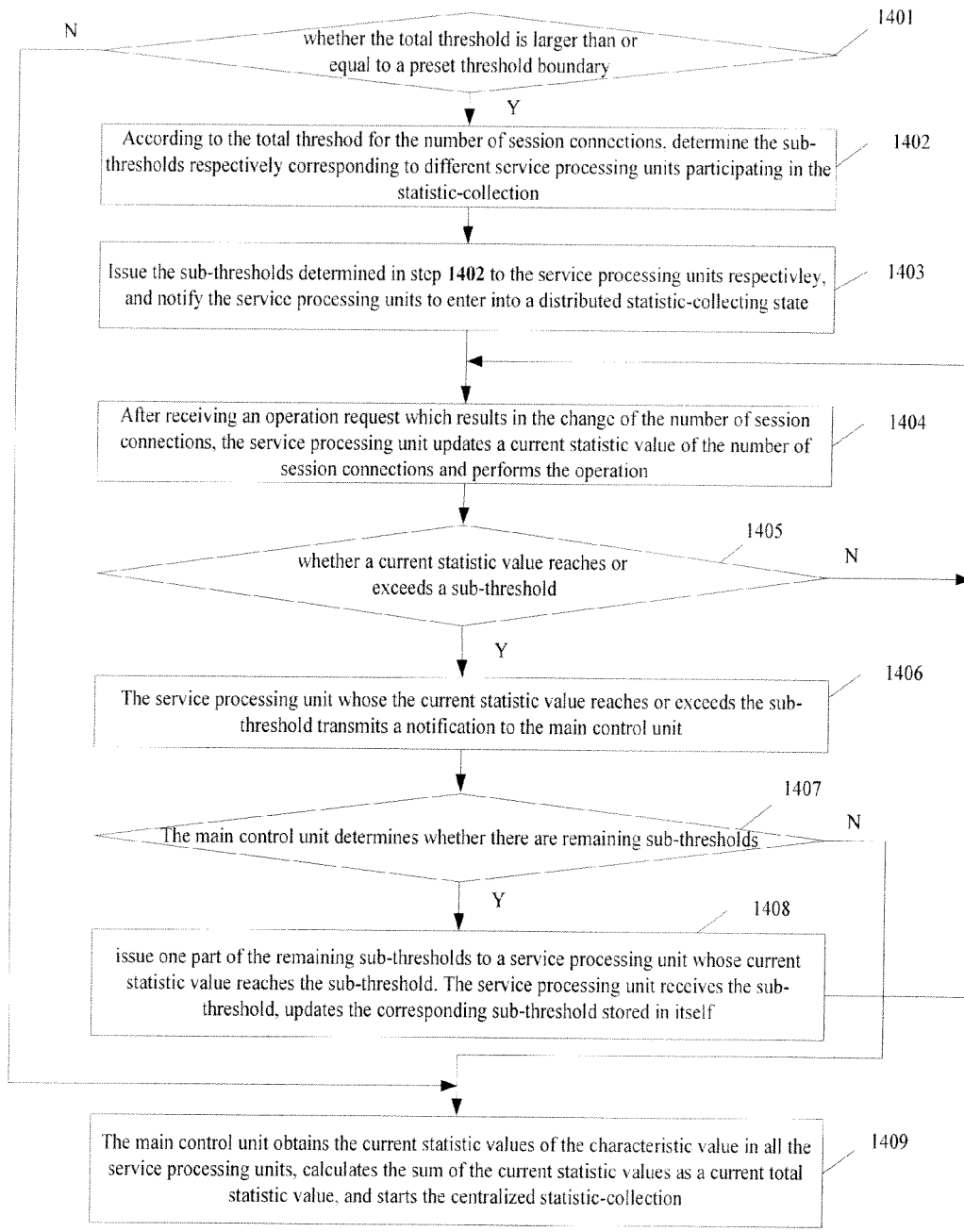
FIG. 12 is a flowchart illustrating a method of distributed statistic-collection for sessions according to a fourth embodiment of the present invention.

FIG. 12 is a flowchart illustrating a method of distributed statistic-collection for sessions according to the fourth embodiment of the present invention. As shown in FIG. 12, the method includes the following steps.

Steps 1401~1406 are basically the same as the operations in steps 501~506 in the first embodiment, except that the sub-thresholds are configured in step 1402 in a different manner. In this embodiment, the sub-thresholds are configured by way of: dividing a total threshold into several parts evenly, wherein each part is one sub-threshold and the number of the parts is larger than the number of application processing units participating in the statistic-collection. Each application processing unit is assigned with one sub-threshold. Thereby, the sum of sub-thresholds of all application processing units is smaller than the total threshold. The main control unit reserves the remaining sub-thresholds. For example, suppose that the total threshold is evenly divided into 10 parts of sub-thresholds and there are 7 application processing units participating in the statistic-collection, 3 parts of sub-thresholds remain after each application processing unit is assigned with one sub-threshold, and the 3 parts of sub-thresholds are reserved.

Step 1407: The main control unit determines whether there are remaining sub-thresholds. If yes, determine that the sub-threshold update is necessary and proceed to step 1408; otherwise, determine that the sub-threshold update is unnecessary and proceed to step 1409.

Step 1408: The main control unit issues one part of the remaining sub-thresholds to an application processing unit whose current statistic value reaches the sub-threshold. The application processing unit receives the sub-threshold, updates the corresponding sub-threshold stored in itself, and returns to step 1404.

In this step, with respect to the application processing unit whose current statistic value reaches the corresponding sub-threshold, if the main control unit still has the remaining sub-thresholds, it issues one part of the remaining sub-thresholds to the application processing unit. After receiving the sub-threshold, the application processing unit adds the sub-threshold to the sub-threshold stored in itself to obtain and store a new sub-threshold, and returns to step 1404.

Herein, because the sub-thresholds assigned initially are the same, an application processing unit whose current statistic value firstly reaches a sub-threshold must have processed the most relevant services during a forgoing period of time. The operations in this step enable the application processing unit whose current statistic value firstly reaches the sub-threshold to have a chance to increase its own sub-threshold. A larger sub-threshold is assigned to the application processing unit that processes relatively more services, thus restriction degrees on the characteristic value of the application processing units are balanced.

The process of returning to step 1404 means to staying in the distributed statistic-collecting state. Thus, compared with the situation of directly entering into the centralized statistic-collecting state after a current statistic value of a certain application processing unit reaches the sub-threshold in the first embodiment, this embodiment further provides a chance to update the sub-threshold when a current statistic value of a certain application processing unit reaches the sub-threshold, so as to keep staying in the distributed statistic-collecting state and further reduce the number of control messages exchanged between the main control unit and the application processing units. This is similar to the third embodiment, except for a difference in the manner of determining whether the sub-threshold update is necessary and the manner of updating the sub-thresholds.

In this embodiment, after a certain application processing unit updates its sub-threshold, if the characteristic value, e.g. the number of session connections, is reduced, the method may preferably further include: each time after a current statistic value of the characteristic value is reduced, the application processing unit determines whether a difference between the sub-threshold and the current statistic value is larger than a preset recyclable threshold; if larger, the application processing unit returns one sub-threshold assigned during the sub-threshold update to the main control unit, and the main control unit recycles the sub-threshold returned by the application processing unit. The process of returning by the application processing unit one sub-threshold may be performed repeatedly until the sub-threshold of the application processing unit is equal to the sub-threshold assigned initially. Herein, the recyclable threshold may be set as slightly larger than one sub-threshold; otherwise, there may be frequent switch between updating the sub-threshold and recycling the sub-threshold. Preferably, the recyclable threshold may be set as larger than or equal to 1.5 times of sub-threshold. After the above processing, when the characteristic value in a certain application processing unit is reduced to some extent, the sub-threshold of the application processing unit is reduced by a certain amount and the certain amount of the sub-threshold is returned to the main control unit and is reassigned by the main control unit to an application processing unit that requires the sub-threshold update.

Step 1409: The main control unit obtains the current statistic values of the characteristic value in all the application processing units, calculates the sum of the current statistic values as a current total statistic value, and starts the centralized statistic-collection.

During the centralized statistic-collection, the operations are similar to the operations in steps 509~511, which will not be described again herein.

Similar to the third embodiment, in this embodiment, in order to further improve the effect of the sub-threshold update, the main control unit may periodically determine whether the sub-threshold update is necessary and periodically perform the update operations, so as to achieve an objective of pre-adjusting the sub-thresholds.

In particular, in the distributed statistic-collecting state, the main control unit periodically obtains the current statistic values of the characteristic value in all application processing units participating in the statistic-collection, determines according to the current statistic values whether the services are inclined to some application processing units. If the services are inclined to some application processing units, preliminarily determine that the sub-threshold update is necessary. Then, with respect to the application processing units to which the sub-threshold update is preliminarily determined to be performed, the main control unit further determines whether the sub-threshold update is indeed necessary one by one. If necessary, update the sub-threshold and notify the application processing unit corresponding to the updated sub-threshold; otherwise, perform no operation.

Herein, whether the services are inclined to some application processing units is determined according to the obtained current statistic values of all the application processing units by the following manner: the main control unit compares a current statistic value of any application processing unit with an update threshold preset for the application processing unit. If the current statistic value is larger than the preset update threshold, determine that the services are inclined to the application processing unit and preliminarily determine that the sub-threshold update is required for the application processing unit; otherwise, determine that the sub-threshold update is unnecessary. With respect to application processing units to which the sub-threshold update is preliminarily determined to be necessary, the main control unit further determines whether the sub-threshold update is indeed necessary one by one in sequence. The sequence may be determined based on how many their statistic values exceed the update thresholds. And generally, the more percentage the statistic value exceeds the update threshold, the former of the corresponding application processing unit in the sequence. The update threshold preset for the application processing unit is usually represented by a percentage, e.g. 90%, of the corresponding sub-threshold. When the current statistic value of the application processing unit exceeds 90% of the corresponding sub-threshold, it is determined that the sub-threshold update is necessary.

The foregoing describes specific implementations of the present invention. In the above four embodiments, the specific implementations of the present invention are described by taking the distributed system with threshold restricted statistic-collection in a single device as an example. As to other systems, the method and system provided in the present invention can also be applied to collecting statistics of a characteristic value with threshold, e.g., applied to an L4~L7 network device in a distributed structure.

The foregoing is only embodiments of the present invention. The protection scope of the present invention, however, is not limited to the above description. Any change or substitution, easily occurring to those skilled in the art, should be covered by the protection scope of the present invention.

What is claimed is:

1. A method for collecting statistics of a characteristic value with a threshold, comprising:
   determining, by a centralized statistics-collecting apparatus, according to a total threshold of a characteristic value whose statistics is to be collected, at least one sub-threshold corresponding to at least one application processing apparatus participating in the statistic-collection;
   issuing, by the centralized statistics-collecting apparatus, the at least one sub-threshold respectively to the at least one application processing apparatus, and notifying, by the centralized statistics-collecting apparatus, the at least one application processing apparatus to enter into a distributed statistic-collecting state;
   after receiving from anyone of the at least one application processing apparatus a notification which indicates that a current statistic value of the characteristic value in the application processing apparatus reaches the sub-threshold corresponding to the application processing apparatus, notifying, by the centralized statistics-collecting apparatus, the at least one application processing apparatus to enter into a centralized statistic-collecting state to collect the statistics of the characteristic value in a centralized mode; and
   comparing the total threshold with a threshold boundary set in advance;
   if the total threshold is larger than or equal to the threshold boundary, performing the step of determining the at least one sub-threshold corresponding to the at least one application processing apparatus participating in the statistic-collection according to the total threshold;
   otherwise, collecting the statistics of the characteristic value in the centralized mode.

2. The method of claim 1, further comprising:
   after notifying the at least one application processing apparatus to enter into the centralized statistic-collecting state,
   storing and updating a current statistic value of the characteristic value of each application processing apparatus, and when the current statistic value of each application processing apparatus is smaller than a lower threshold preset for the application processing apparatus, notifying each application processing apparatus to exit from the centralized statistic-collecting state and enter into the distributed statistic-collecting state;
   or,
   storing and updating a sum of all current statistic values of the characteristic value of all the application processing apparatuses, and when the sum is smaller than a total lower threshold set in advance, notifying the at least one application processing apparatus to exit from the centralized statistic-collecting state and enter into the distributed statistic-collecting state;
   or,
   after every preset time interval, setting, by each of the at least one application processing apparatus, the current statistic value of the application processing apparatus as 0, exiting from the centralized statistic-collecting state and entering into the distributed statistic-collecting state.

3. The method of claim 1, wherein the collecting the statistics of the characteristic value in the centralized mode comprises:
   obtaining a current statistic value respectively from the at least one application processing apparatus to obtain at least one current statistic value, and calculating a sum of the at least one current statistic value as a current total statistic value; and
   after receiving from any of the at least one application processing apparatus a request of an operation which results in a change of the statistics of the characteristic value, comparing the current total statistic value with the total threshold; if the current total statistic value reaches or exceeds the total threshold, starting a restrictive operation; otherwise, updating the current total statistic value of the characteristic value according to the request and notifying the application processing apparatus which transmits the request to perform a normal operation.

4. The method of claim 3, wherein the operation which results in the change of the statistics of the characteristic value comprises: an operation of adding 1 to the characteristic value and an operation of subtracting 1 from the characteristic value;
   the restrictive operation comprises: notifying the application processing apparatus which transmits the request to refuse the request, and/or recording a threshold overflow event, and/or giving an alarm.

5. The method of claim 1, wherein the determining the at least one sub-threshold corresponding to the at least one application processing apparatus participating in the statistic-collection according to the total threshold comprises:
   configuring an identical sub-threshold for each application processing apparatus according to the total threshold and the number of the at least one application processing apparatus participating in the statistic-collection; or
   configuring different sub-thresholds for different application processing apparatuses according to the number of the at least one application processing apparatus participating in the statistic-collection, processing capabilities of the at least one application processing apparatus and service loads of the at least one application processing apparatus.

6. The method of claim 1, further comprising:
   after notifying the at least one application processing apparatus to enter into the distributed statistic-collecting state, determining whether a sub-threshold update is necessary; if the sub-threshold update is necessary, updating the at least one sub-threshold corresponding to the at least one application processing apparatus, issuing the at least one updated sub-threshold, and notifying the at least one application processing apparatus to collect statistics according to the at least one updated sub-threshold in the distributed mode.

7. The method of claim 6, wherein the determining whether the sub-threshold update is necessary comprises:
   obtaining a current statistic value of the characteristic value of each application processing apparatus to obtain at least one current statistic value, calculating a first difference between a sum of the at least one current statistic value and the total threshold, and comparing the first difference with a first difference threshold set in advance; if the first difference is larger than the first difference threshold, determining that the sub-threshold update is necessary; if the first difference is not larger than the first difference threshold, determining that the sub-threshold update is unnecessary;
   or,
   obtaining the current statistic value of the characteristic value of each application processing apparatus to obtain at least one current statistic value, calculating a second difference between a maximum value and a minimum value among the at least one current statistic value, and comparing the second difference with a second difference threshold set in advance; if the second difference is larger than the second difference threshold, determining that the sub-threshold update is necessary; if the second difference is not larger than the second difference threshold, determining that the sub-threshold update is unnecessary;

or, obtaining a current statistic value of the characteristic value of each application processing apparatus to obtain at least one current statistic value, calculating the sum of the at least one current statistic value, calculating the first difference between the total threshold and the sum, and comparing the first difference with a threshold boundary set in advance; if the first difference is larger than the threshold boundary, determining that the sub-threshold update is necessary; if the first difference is not larger than the threshold boundary, the sub-threshold update is unnecessary.

8. The method of claim 6, wherein the updating the at least one sub-threshold corresponding to the at least one application processing apparatus comprises:

determining the at least one updated sub-threshold respectively corresponding to the at least one application processing apparatus according to the at least one statistic value of the at least one application processing apparatus and the first difference;

or, determining a first updated sub-threshold for a first application processing apparatus which has the maximum value and determining a second updated sub-threshold for a second application processing apparatus which has the minimum value according to the maximum value, the minimum value, a first sub-threshold of the first application processing apparatus and a second sub-threshold of the second application processing apparatus.

9. The method of claim 6, wherein the determining whether the sub-threshold update is necessary is performed periodically; or the determining whether the sub-threshold update is necessary is performed when receiving from anyone of the at least one application processing apparatus a notification that a current statistic value of the application processing apparatus reaches a sub-threshold of the application processing apparatus.

10. The method of claim 1, wherein the threshold boundary is set according to a type of the characteristic value whose statistics is to be collected and the number of the at least one application processing apparatus.

11. The method of claim 1, wherein the number of the at least one sub-threshold is larger than the number of the at least one application processing apparatus; and the issuing the at least one sub-threshold respectively to the at least one application processing apparatus comprises: issuing one sub-threshold to each application processing apparatus participating in the statistic-collection, and saving the remaining sub-threshold(s).

12. The method of claim 11, further comprising:

in the distributed statistic-collecting state, determining, by a centralized statistics-collecting apparatus, whether a sub-threshold update is necessary, if the sub-threshold update is necessary, updating the at least one sub-threshold, and issuing the at least one updated sub-threshold respectively to the at least one application processing apparatus; and collecting, by the at least one application processing apparatus, the statistics according to the at least one updated sub-threshold in the distributed mode.

13. The method of claim 12, wherein the determining whether the sub-threshold update is necessary comprises:

determining whether there is a remaining sub-threshold;

if there is a remaining sub-threshold, determining that the sub-threshold update is necessary;

if there is no remaining sub-threshold, determining that the sub-threshold update is unnecessary.

14. The method of claim 12, wherein the updating the at least one sub-threshold and issuing the at least one updated sub-threshold respectively to the at least one application processing apparatus comprise:

issuing one sub-threshold of the remaining sub-threshold(s) to each application processing apparatus which requires sub-threshold update; and calculating by each application processing apparatus, the sum of the one sub-threshold received and a sub-threshold stored in the service processing apparatus, and taking the sum as the updated sub-threshold.

15. The method of claim 1, wherein the characteristic value comprises the number of various connections of a source or destination Internet Protocol (IP) address in a network security system.

16. A centralized statistics-collecting apparatus, comprising:

a sub-threshold calculation module, comprising a processor coupled to a memory storing instructions, for execution by the processor, configured to determine, according to a total threshold of a characteristic value whose statistic is to be collected, at least one sub-threshold corresponding to at least one application processing apparatus participating in statistic-collection;

a control module, comprising a processor coupled to a memory storing instructions for execution by the processor, configured to issue the at least one sub-threshold determined by the sub-threshold calculation module to the at least one application processing apparatus, notify the at least one application processing apparatus to enter into a distributed statistic-collecting state; notify, after receiving from any of the at least one application processing apparatus a notification which indicates that a current statistic value of the application processing apparatus exceeds a sub-threshold corresponding to the application processing apparatus, the at least one application processing apparatus to enter into a centralized statistic-collecting state, and notify a first statistic-collecting module to perform a centralized statistic-collection; and the first statistic-collecting module comprising a processor coupled to a memory storing instructions for execution by the processor, configured to receive from the control module a notification of performing the centralized statistic-collection and collect the statistic of the characteristic value in a centralized mode, wherein the control module is further configured to compare the total threshold with a threshold boundary which is set in advance, and trigger the sub-threshold calculation module to calculate the at least one sub-threshold if the total threshold is larger than or equal to the threshold boundary; and the sub-threshold calculation module is configured to calculate the at least one sub-threshold when receiving a trigger notification from the control module.

17. The centralized statistics-collecting apparatus of claim 16, wherein the first statistic-collecting module is further configured to store and update a current statistic value of the characteristic value of each application processing apparatus and provide the current statistic value to the control module;

the control module is further configured to receive the current statistic value of each application processing apparatus from the first statistic-collecting module, respectively compare the current statistic value of each application processing apparatus with a lower threshold preset for the application processing apparatus, notify each application processing apparatus and the first statistic-collecting module to exit from the centralized statistic-collecting state and enter into the distributed statistic-collecting state if the current statistic value of each application processing apparatus is respectively smaller than the lower threshold preset for the application processing apparatus; or receive the current statistic value of each application processing apparatus from the first statistic-collecting module, compare the sum of the current statistic value of each application processing apparatus with a total lower threshold set in advance, notify each application processing apparatus and the first statistic-collecting module to exit from the centralized statistic-collecting state and enter into the distributed statistic-collecting state if the sum is smaller than the total lower threshold; and the first statistic-collecting module is further configured to stop collecting the statistic in the centralized mode after receiving a notification of entering into the distributed statistic-collecting state.

18. The centralized statistics-collecting apparatus of claim 16, wherein after entering into the centralized statistic-collecting state, the first statistic-collecting module is further configured to enter into the distributed statistic-collecting state and stop collecting the statistic in the centralized mode after every preset time interval.

19. The centralized statistics-collecting apparatus of claim 16, wherein after entering into the distributed statistic-collecting state, the control module is further configured to determine whether a sub-threshold update is necessary, notify, if the sub-threshold update is necessary, the sub-threshold calculation module to update the at least one sub-threshold; issue at least one updated sub-threshold received to the at least one application processing apparatus; and the sub-threshold calculation module is further configured to update the at least one sub-threshold and transmit the at least one updated sub-threshold to the control module after receiving a sub-threshold update notification.

20. A method for collecting statistics of a characteristic value with a threshold, comprising:

receiving, by at least one application processing apparatus, a first sub-threshold and a notification of entering into a distributed statistic-collecting state transmitted by a centralized statistics-collecting apparatus;

collecting, by the at least one application processing apparatus, statistics of a characteristic value in a distributed mode according to the notification of entering into the distributed statistic-collecting state;

notifying, by the at least one application processing apparatus, the centralized statistics-collecting apparatus when a current statistic value of the characteristic value reaches the first sub-threshold;

receiving, by the at least one application processing apparatus, a notification of entering into a centralized statistic-collecting state;

collecting, by the at least one application processing apparatus, statistics of the characteristic value in a centralized mode according to the notification of entering into the centralized statistic-collecting state;

receiving from the centralized statistics-collecting apparatus a second sub-threshold; and updating the first sub-threshold by the second sub-threshold and collecting the statistics of the characteristic value in the distributed mode according to the second sub-threshold; or updating the first sub-threshold by a sum of the second sub-threshold and the first sub-threshold, and collecting statistics of the characteristic value in the distributed mode according to the updated sub-threshold.

21. The method of claim 20, further comprising:
after every preset time interval, setting the current statistic value as 0, and exiting from the centralized statistic-collecting state and entering into the distributed statistic-collecting state.

22. The method of claim 20, further comprising:
after updating the first statistic value, determining whether a difference between the updated sub-threshold and the first statistic value is larger than a recyclable threshold set in advance, and returning a portion of the updated sub-threshold to the centralized statistics-collecting apparatus if the first statistic value is larger than the recyclable threshold.

23. An application processing apparatus, comprising:
an interface module comprising a processor coupled to a memory storing instructions for execution by the processor, configured to receive a sub-threshold, a notification of entering into a distributed statistic-collecting state and a notification of entering into a centralized statistic-collecting state from a centralized statistics-collecting apparatus; and a statistic-collecting module comprising a processor coupled to a memory storing instructions for execution by the processor, configured to receive the sub-threshold, the notification of entering into the distributed statistic-collecting state and the notification of entering into the centralized statistic-collecting state from the interface module, enter into the distributed statistic-collecting state after receiving the notification of entering into the distributed statistic-collecting state from the interface module, collect statistics of a characteristic value, update and store a current statistic value of the characteristic value; notify the centralized statistics-collecting apparatus through the interface module when the current statistic value reaches the sub-threshold, and collect statistics of the characteristic value in a centralized mode after receiving the notification of entering into the centralized statistic-collecting state.

24. The application processing apparatus of claim 23, wherein after entering into the centralized statistic-collecting state, the statistic-collecting module is further configured to clear up the current statistic value and enter into the distributed statistic-collecting state after every preset time interval; or enter into the distributed statistic-collecting state after receiving another notification of entering into the distributed statistic-collecting state from the interface module.

25. The application processing apparatus of claim 23, wherein the interface module is configured to transmit an updated sub-threshold received from the centralized statistics-collecting apparatus to the statistic-collecting module; and the statistic-collecting module is configured to update the stored sub-threshold according to the updated sub-threshold.

26. A system for collecting statistics of a characteristic value with a threshold, comprising: a centralized statistics-collecting apparatus and at least one application processing apparatus participating in statistic-collection; wherein
   the centralized statistics-collecting apparatus is configured to
   determine, according to a total threshold of a characteristic value whose statistic is to be collected, at least one sub-threshold corresponding to the at least one application processing apparatus;
   issue the at least one sub-threshold respectively to the at least one application processing apparatus, and notify the at least one application processing apparatus to enter into a distributed statistic-collecting state; and
   notify, after receiving from anyone of the at least one application processing apparatus a notification which indicates that a current statistic value of the application processing apparatus reaches a sub-threshold corresponding to the application processing apparatus, the at least one application processing apparatus to enter into a centralized statistic-collecting state; and
   each of the at least one application processing apparatus is adapted configured to
   collect statistics of the characteristic value after receiving a notification of entering into the distributed statistic-collecting state from the centralized statistics-collecting apparatus,
   notify the centralized statistics-collecting apparatus when a current statistic value of the characteristic value reaches a sub-threshold corresponding to the service processing apparatus; and
   collect statistics of the characteristic value in a centralized mode after receiving a notification of entering into the centralized statistic-collecting state from the centralized statistics-collecting apparatus.

27. The system of claim 26, wherein the centralized statistics-collecting apparatus is one part of a main control apparatus, or a newly-added apparatus dedicated for the centralized statistic-collection, or one part of a designated application processing apparatus.

28. A method for collecting statistics of a characteristic value with a threshold, comprising:
   collecting, by at least one application processing apparatus, statistics of a characteristic value according to a sub-threshold obtained from a centralized statistics-collecting apparatus;
   notifying, by at least one application processing apparatus, the centralized statistics-collecting apparatus when a current statistic value of the characteristic value reaches the sub-threshold;
   collecting, by at least one application processing apparatus, statistics of the characteristic value in a centralized mode after receiving a notification of entering into a centralized statistic-collecting state from the centralized statistics-collecting apparatus; and
   performing a normal operation or a restrictive operation to a request of an operation which results in change of the statistics of the characteristic value according to a notification from the centralized statistics-collecting apparatus which indicates to perform the normal operation or the restrictive operation,
   wherein the operation which results in the change of the statistics of the characteristic value comprises an operation of adding 1 to the characteristic value and an operation of subtracting 1 from the characteristic value, and
   wherein the restrictive operation comprises notifying an application processing apparatus transmitting the request to refuse the request, and/or recording a threshold overflow event, and/or giving an alarm.

29. The method of claim 28, further comprising:
   updating the sub-threshold with another sub-threshold provided by the centralized statistics-collecting apparatus, and collecting statistics of the characteristic value according to the updated sub-threshold.

* * * * *